US010716002B2

(12) United States Patent
Rajadurai et al.

(10) Patent No.: US 10,716,002 B2
(45) Date of Patent: Jul. 14, 2020

(54) METHOD AND SYSTEM FOR AUTHENTICATING ACCESS IN MOBILE WIRELESS NETWORK SYSTEM

(71) Applicant: Samsung Electronics Co., Ltd., Gyeonggi-do (KR)

(72) Inventors: Rajavelsamy Rajadurai, Bangalore (IN); Duckey Lee, Seoul (KR); Jicheol Lee, Gyeonggi-do (KR); Jungje Son, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 16/315,433

(22) PCT Filed: Jul. 5, 2017

(86) PCT No.: PCT/KR2017/007190
§ 371 (c)(1),
(2) Date: Jan. 4, 2019

(87) PCT Pub. No.: WO2018/008983
PCT Pub. Date: Jan. 11, 2018

(65) Prior Publication Data
US 2019/0261178 A1 Aug. 22, 2019

(30) Foreign Application Priority Data

| Jul. 5, 2016 | (IN) | ................ 201641023119 |
| Jul. 21, 2016 | (IN) | ................ 201641025054 |
| Jul. 3, 2017 | (IN) | ................ 201641023119 |

(51) Int. Cl.
| H04W 12/00 | (2009.01) |
| H04W 12/06 | (2009.01) |
| H04L 29/06 | (2006.01) |
| H04W 8/18 | (2009.01) |
| H04W 76/27 | (2018.01) |
| H04B 7/0413 | (2017.01) |

(52) U.S. Cl.
CPC ......... *H04W 12/06* (2013.01); *H04L 63/0892* (2013.01); *H04L 63/162* (2013.01);
(Continued)

(58) Field of Classification Search
CPC ..... H04W 12/06; H04W 12/001; H04W 8/18; H04W 76/27; H04L 63/0892; H04L 63/162; H04B 7/0413
See application file for complete search history.

(56) References Cited

U.S. PATENT DOCUMENTS 7,660,417 B2 * 2/2010 Blom ................. H04L 63/0428
380/249
2006/0229071 A1 10/2006 Haverinen et al.
(Continued)

FOREIGN PATENT DOCUMENTS

| KR | 101262344 | 5/2013 |
| WO | WO 2016/084865 | 6/2016 |

OTHER PUBLICATIONS

PCT/ISA/210 Search Report issued on PCT/KR2017/007190 (pp. 3).
(Continued)

Primary Examiner — Khai M Nguyen
(74) Attorney, Agent, or Firm — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety (Continued)

services. Embodiments herein achieve a method for authenticating access in a mobile wireless network system. The method includes receiving by an Extensible Authentication Protocol (EAP) authenticator an EAP packet encapsulated from an access terminal over a high rate packet data radio link and a signaling interface through a radio access network. The EAP packet is encapsulated over at least one of a Non-Access Stratum (NAS) interface, a Radio Resource Control (RRC) interface and a N1 interface. The EAP authenticator is located at a secured node in a core network of the radio access network. Further, the method includes authenticating by the EAP authenticator at least one of a network access subscription and a service of the access terminal.

21 Claims, 32 Drawing Sheets

(52) U.S. Cl.
CPC ............ *H04W 8/18* (2013.01); *H04W 12/001* (2019.01); *H04B 7/0413* (2013.01); *H04W 76/27* (2018.02)

(56) References Cited

U.S. PATENT DOCUMENTS

| | | |
|---|---|---|
| 2011/0265146 A1 | 10/2011 | He |
| 2013/0137398 A1* | 5/2013 | Yang ................... H04W 12/04 455/411 |
| 2014/0079022 A1 | 3/2014 | Wang et al. |
| 2015/0092942 A1* | 4/2015 | Wager .................. H04L 63/061 380/270 |
| 2015/0264612 A1* | 9/2015 | Baek ..................... H04W 36/08 370/331 |
| 2016/0029213 A1* | 1/2016 | Rajadurai ............. H04W 76/27 380/283 |
| 2016/0157095 A1* | 6/2016 | Zhang ............... H04W 72/0413 380/273 |
| 2017/0265241 A1 | 9/2017 | Fujishiro et al. |
| 2018/0041490 A1* | 2/2018 | Hampel .................. H04L 63/06 |
| 2018/0084544 A1* | 3/2018 | Xu ........................ H04W 76/18 |
| 2018/0227752 A1* | 8/2018 | Teyeb .................... H04W 12/04 |
| 2018/0227815 A1* | 8/2018 | Sharma ................. H04W 88/06 |
| 2019/0007869 A9* | 1/2019 | Sirotkin ................ H04W 36/30 |

OTHER PUBLICATIONS

PCT/ISA/237 Written Opinion issued on PCT/KR2017/007190 (pp. 8).
BlackBerry UK Ltd., Broadcom Corp. , 3GPP TSG SA3 WG Meeting #82, S3-160253 revised S3-160050, Feb. 1-5, 2016, Dubrovinik, Croatia, . . . Overview of 802.1X based method for . . . authentication over WLAN in LTE-WLAN Aggregation, (pp. 9).
Nokia, Broadcom, Huawei, HiSilicon, Qualcomm, Intel, "LWA Technical and Editorial Corrections", S3-160721, 3GPP TSG-SA3 Meeting #83, May 9-13, 2016, 8 pages.
European Search Report dated Oct. 23, 2019 issued in counterpart application No. 17824539.5-1218, 9 pages.

* cited by examiner

[Fig. 1]
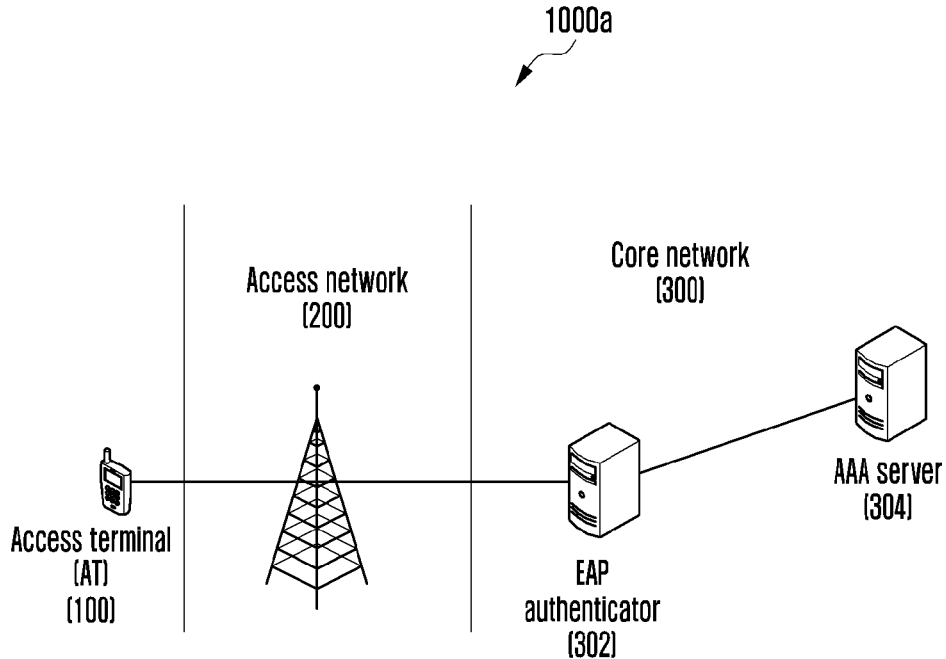
[Fig. 2]
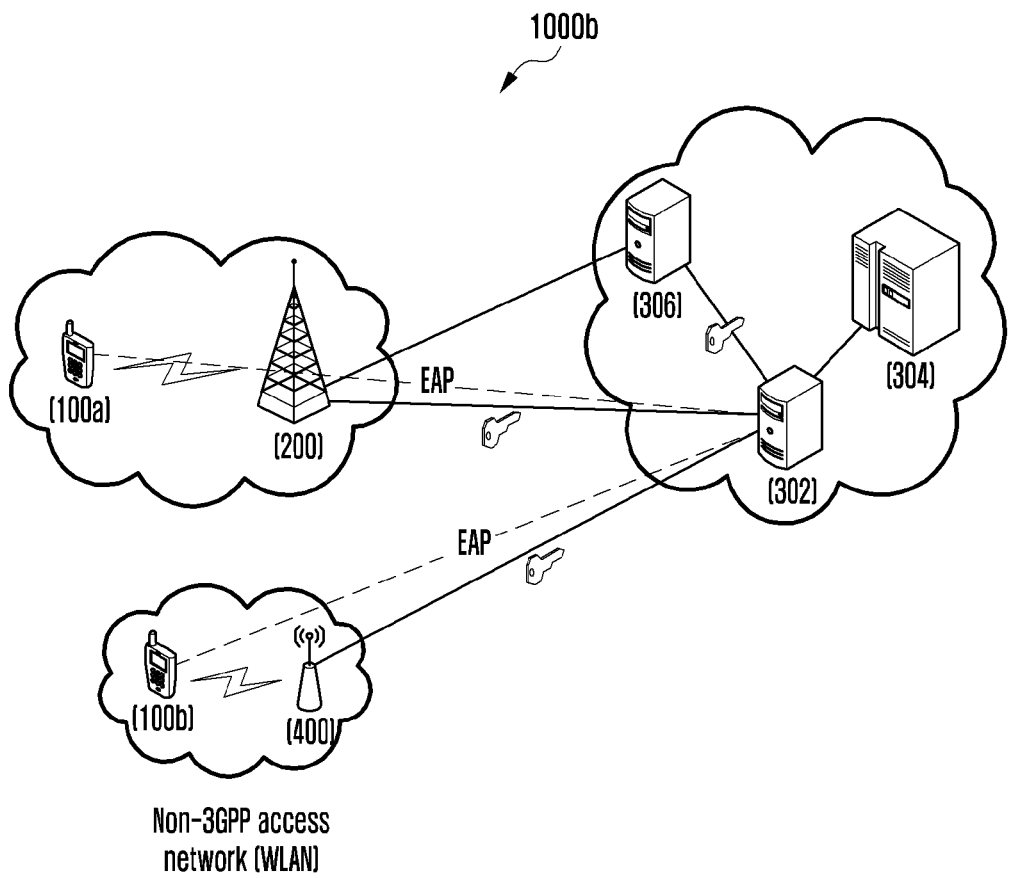
Non-3GPP access
network (WLAN)

[Fig. 3]
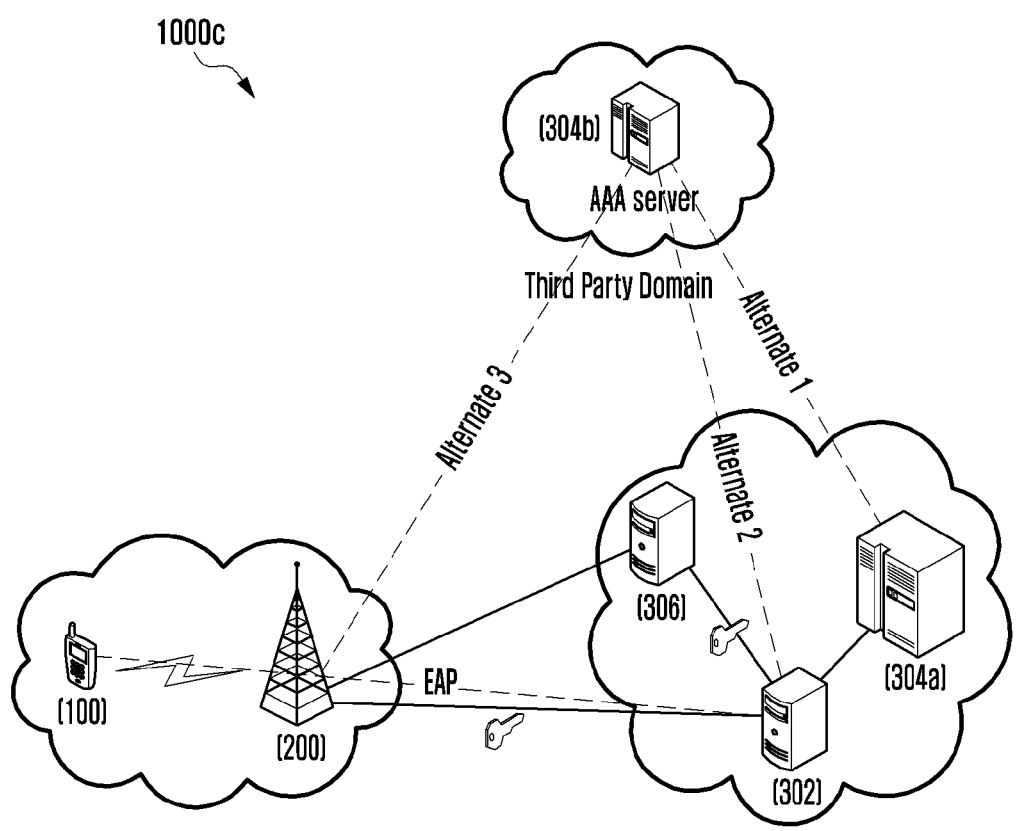

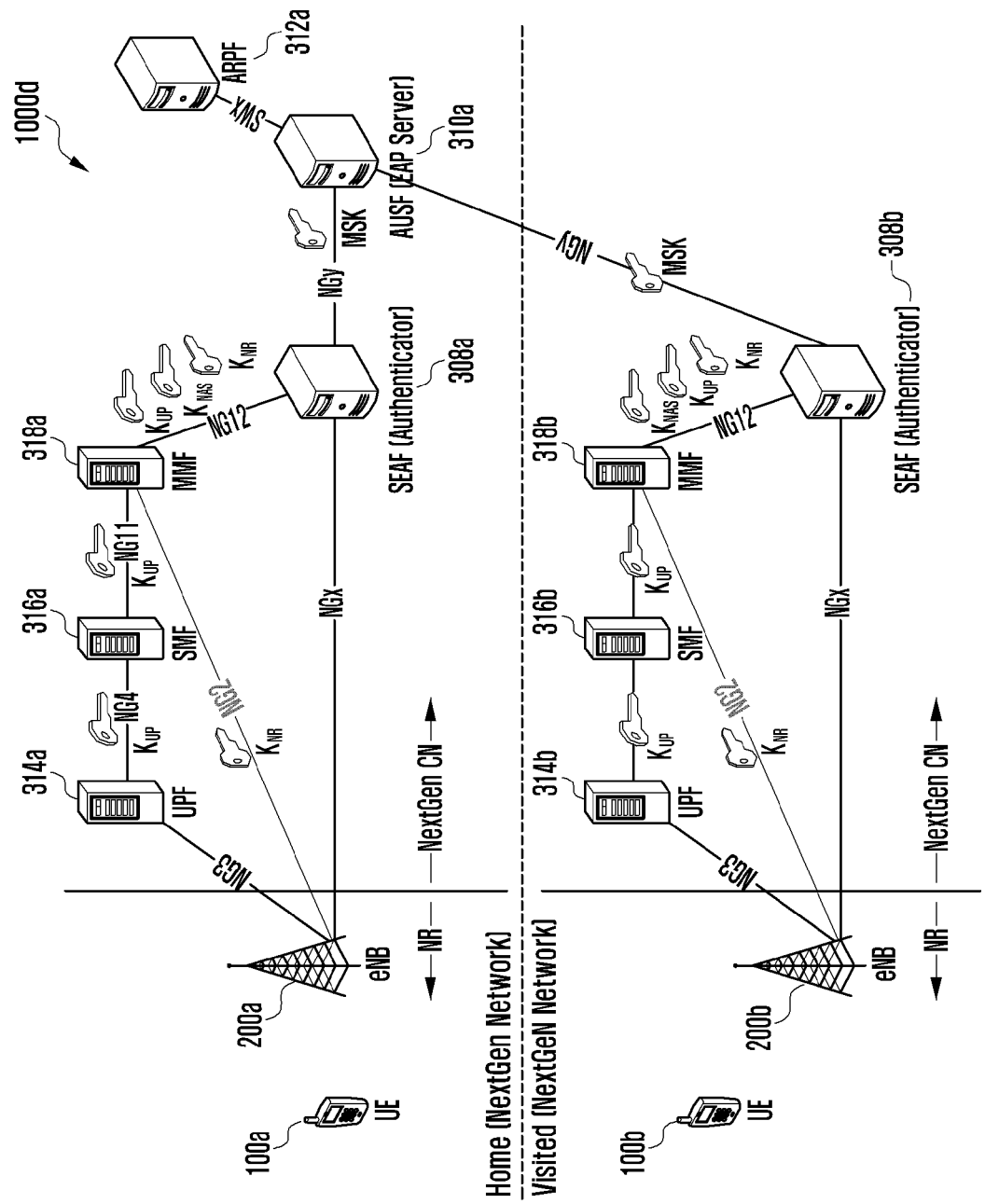
[Fig. 4]

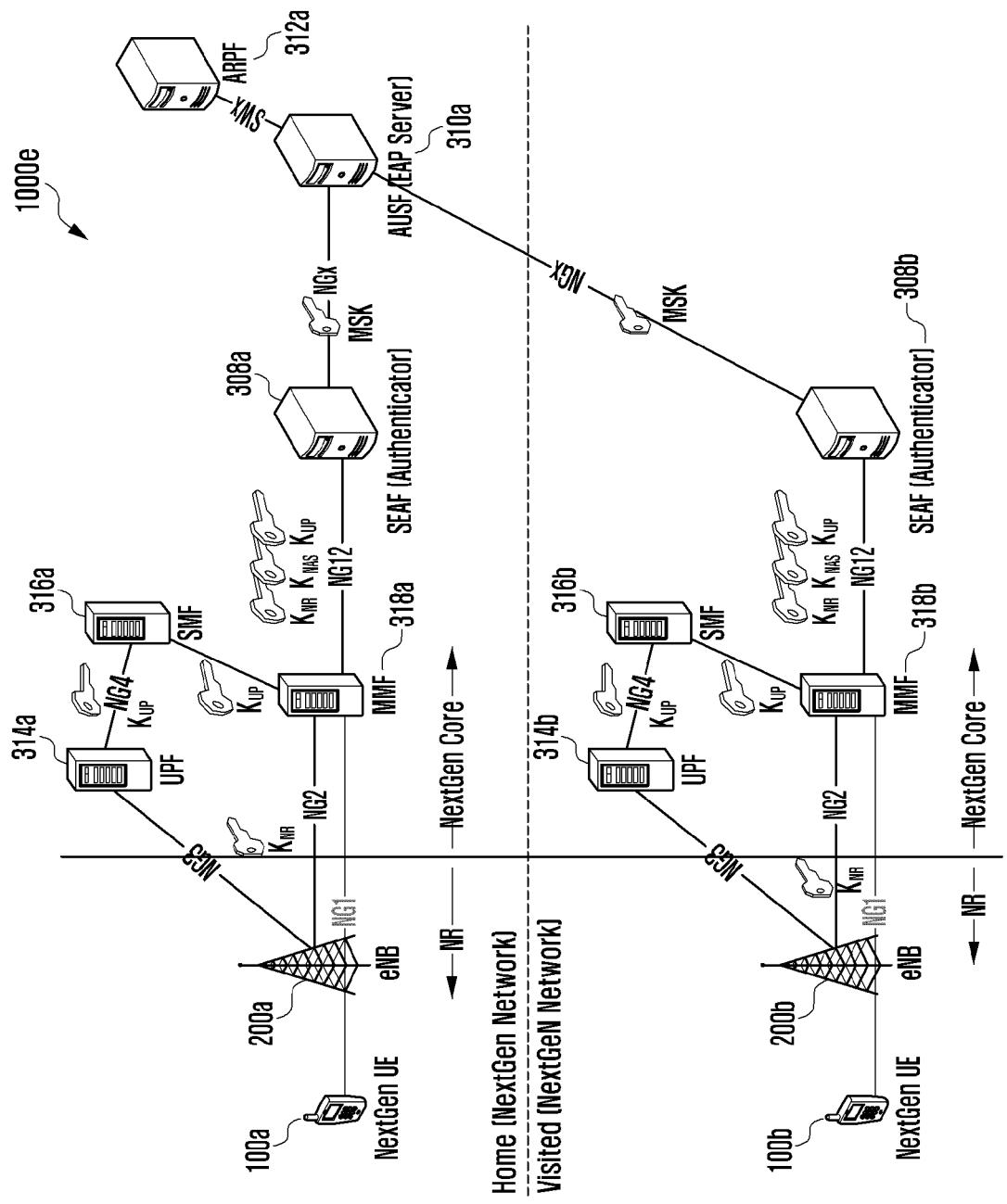
[Fig. 5]

[Fig. 6a]
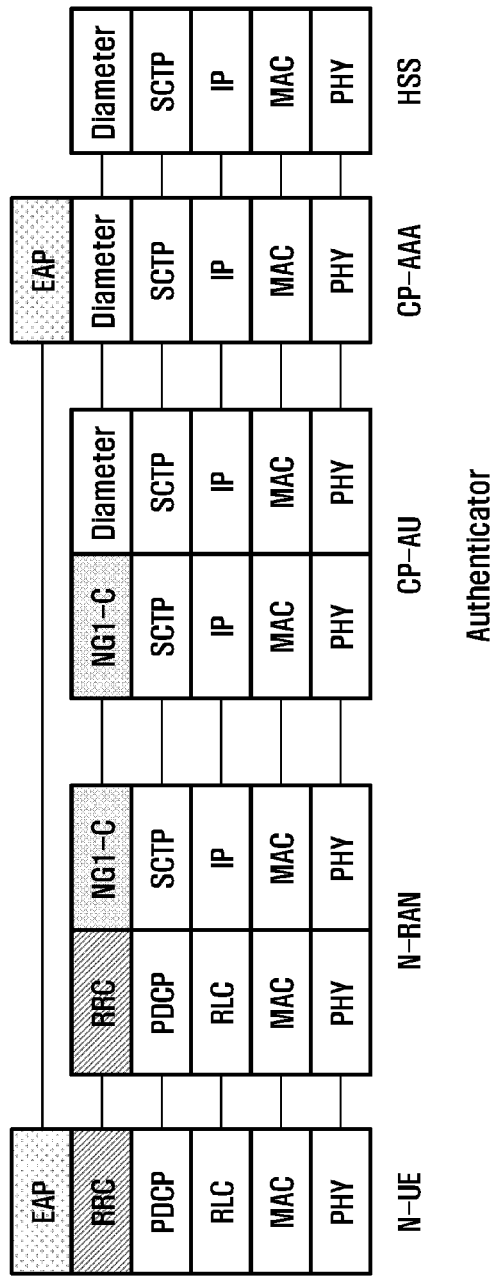

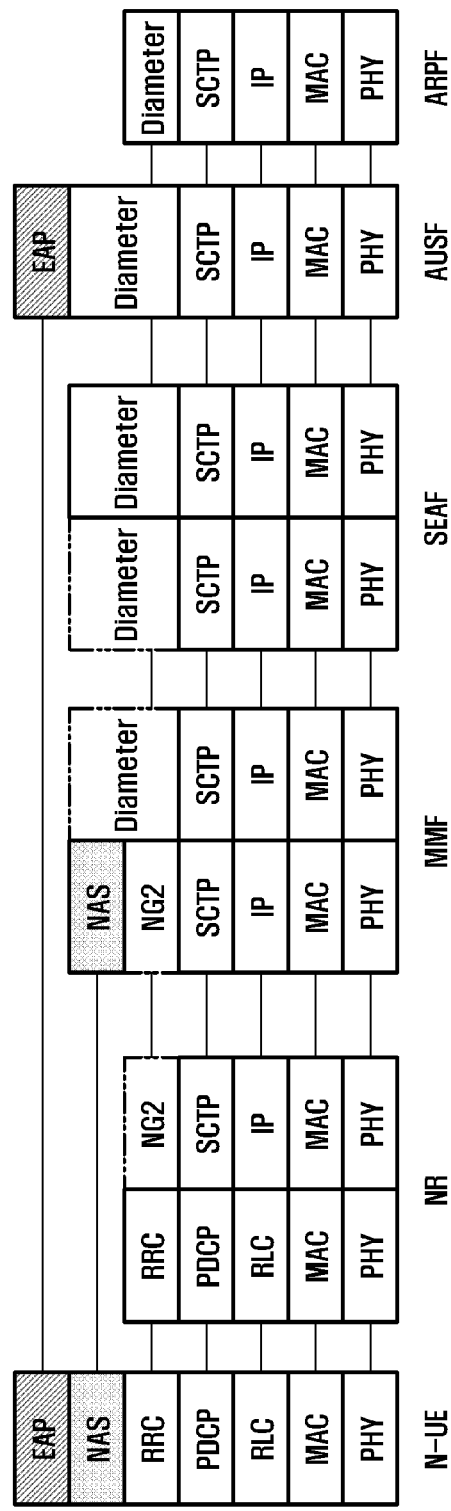
[Fig. 6b]

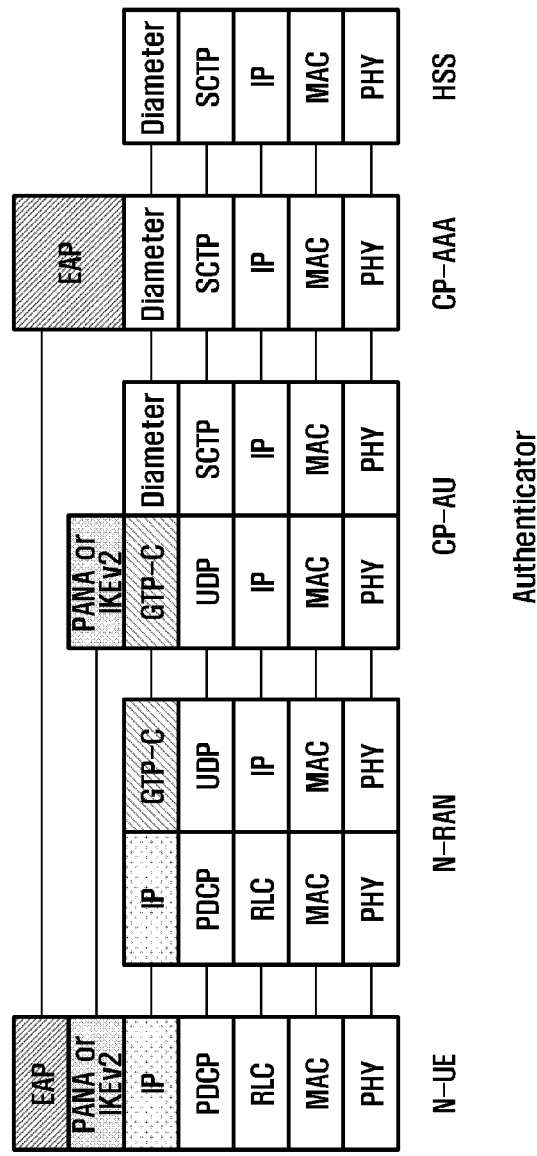
[Fig. 6c]

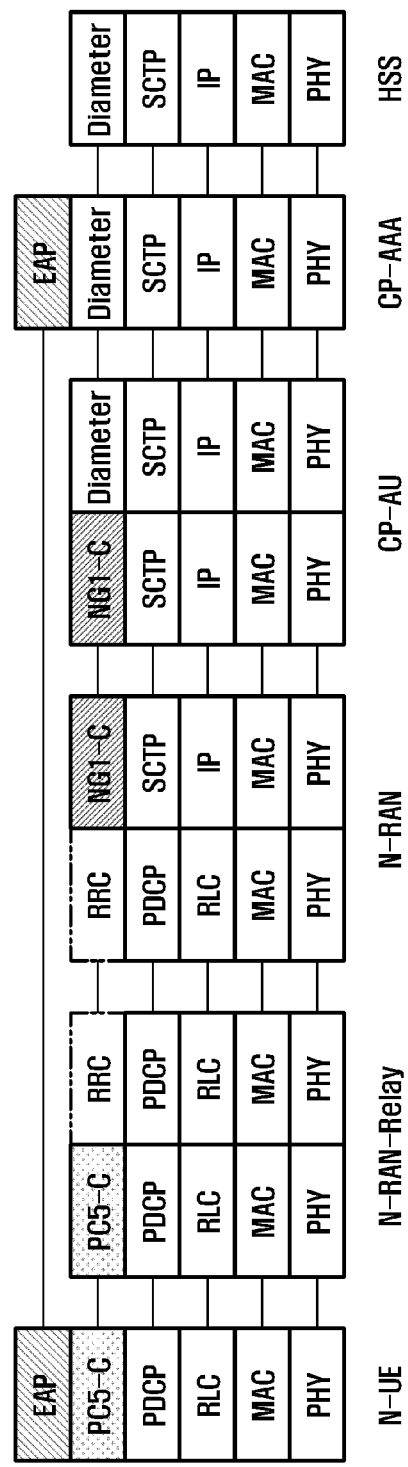
[Fig. 7a]

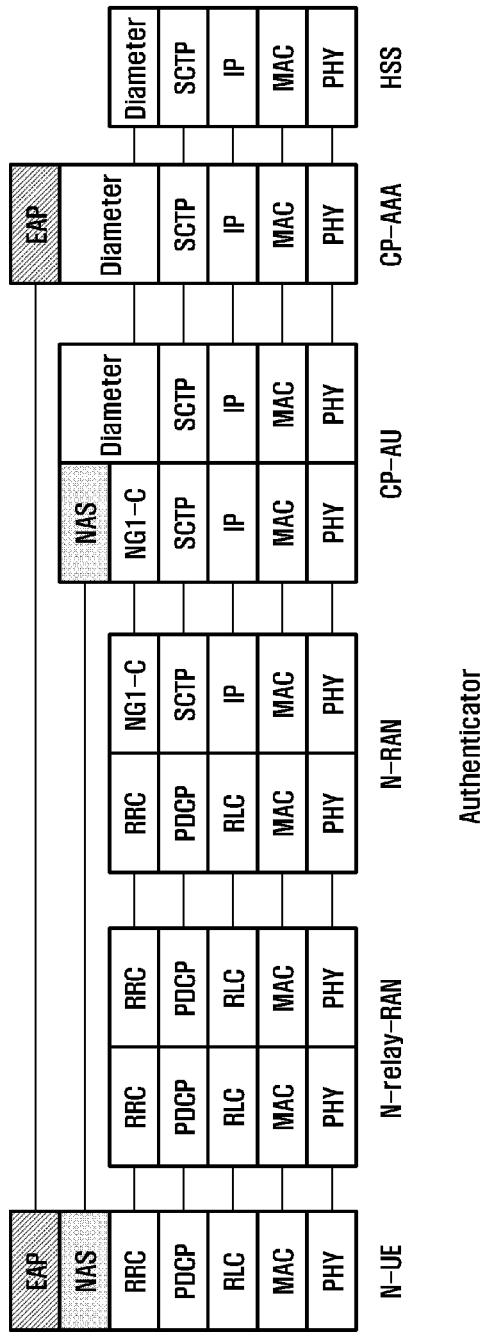
[Fig. 7b]

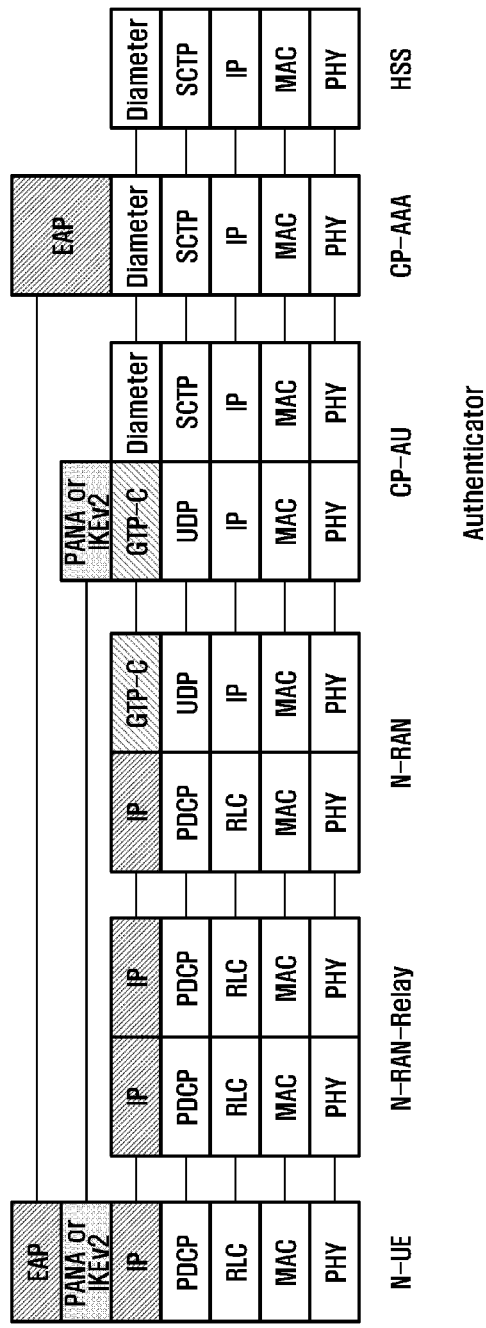
[Fig. 7c]

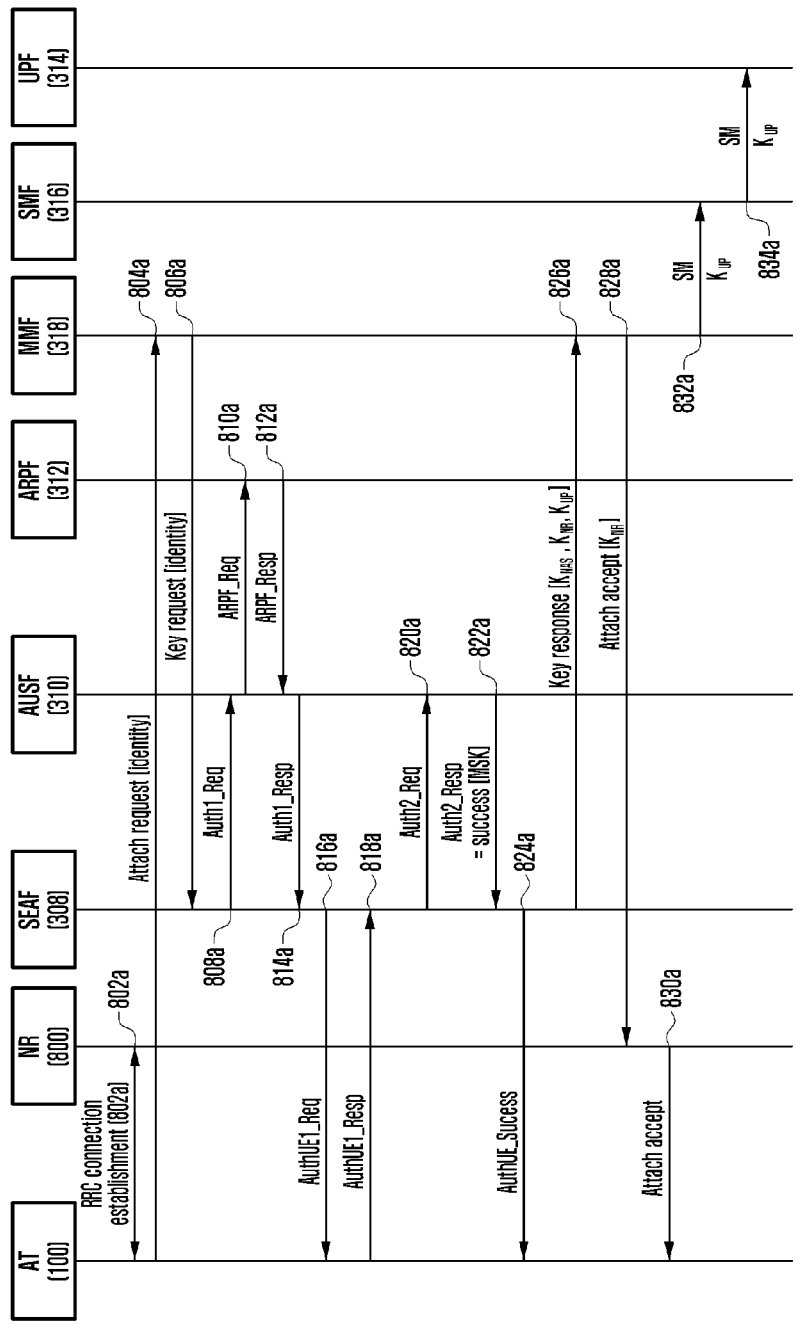
[Fig. 8a]

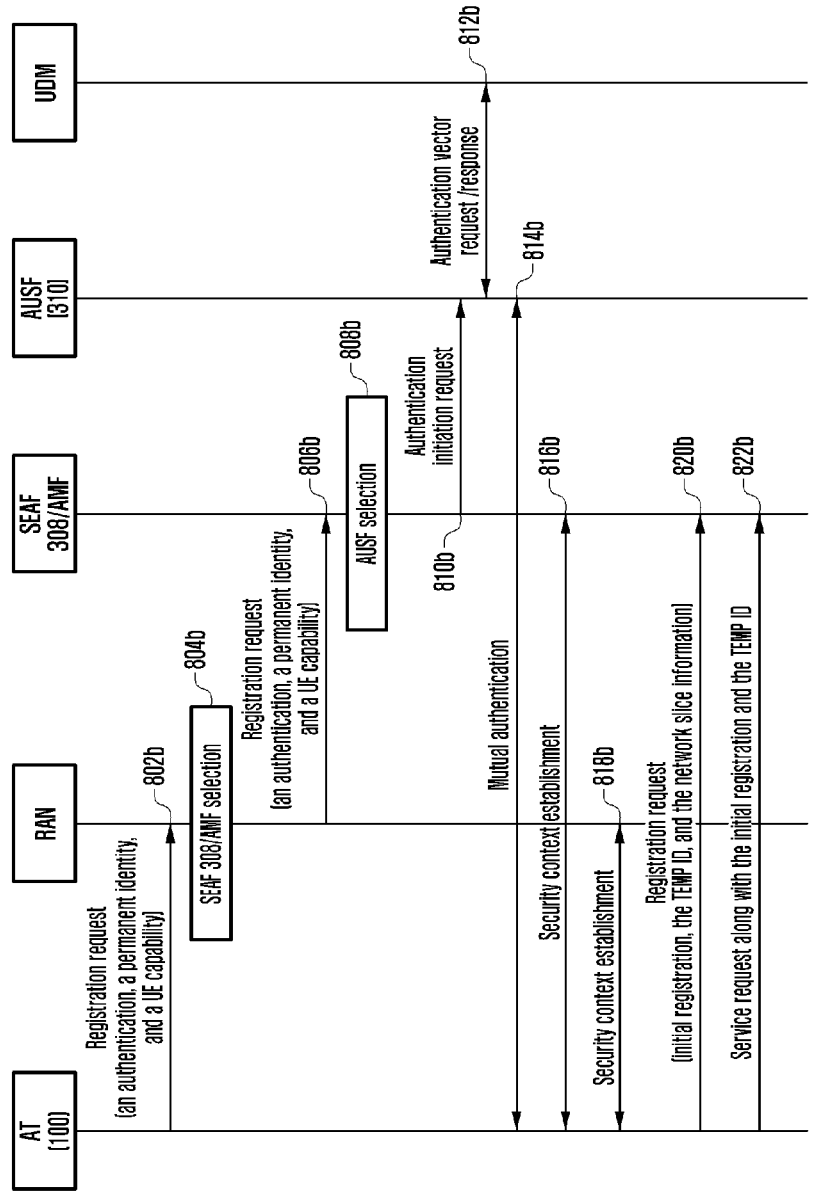
[Fig. 8b]

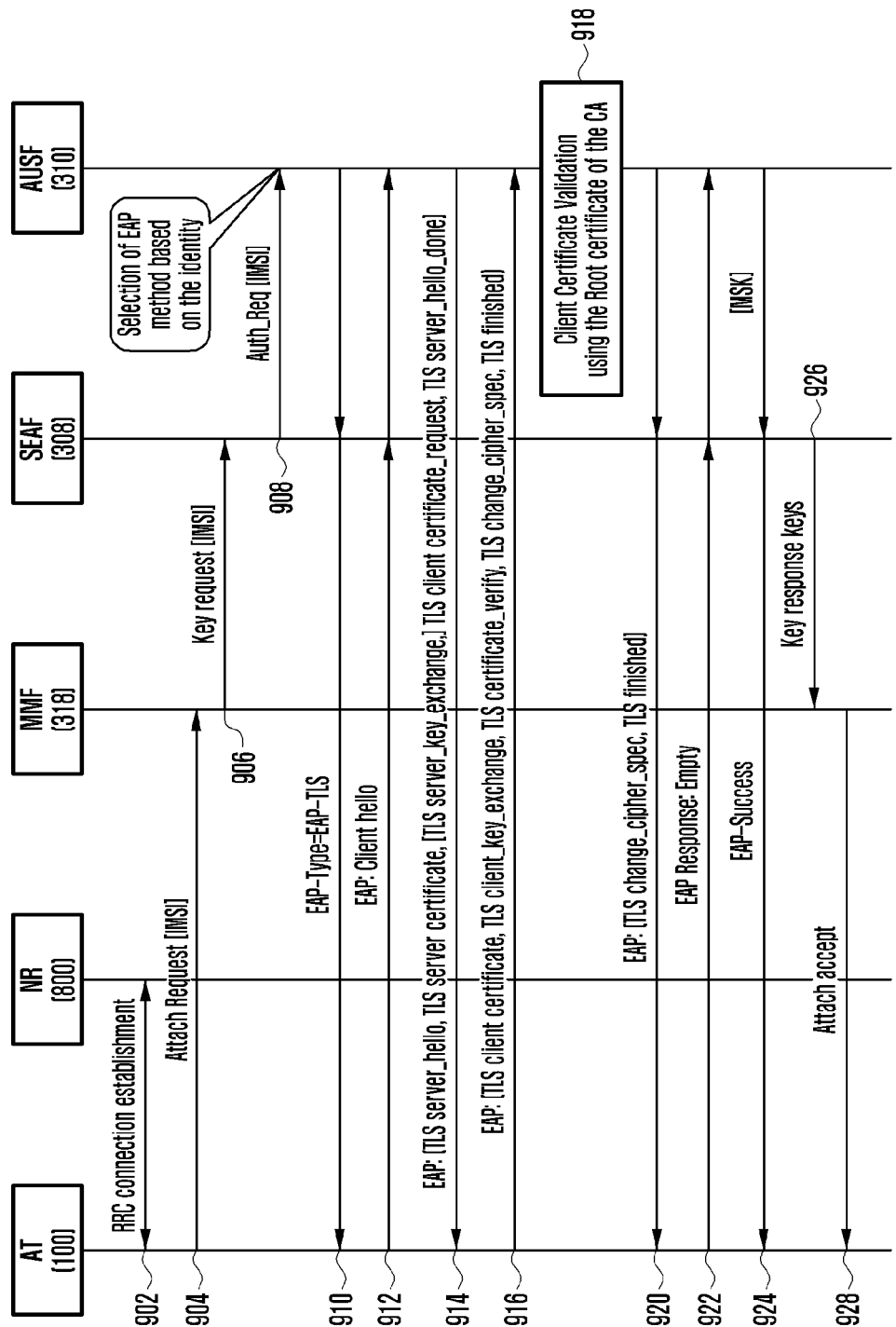
[Fig. 9]

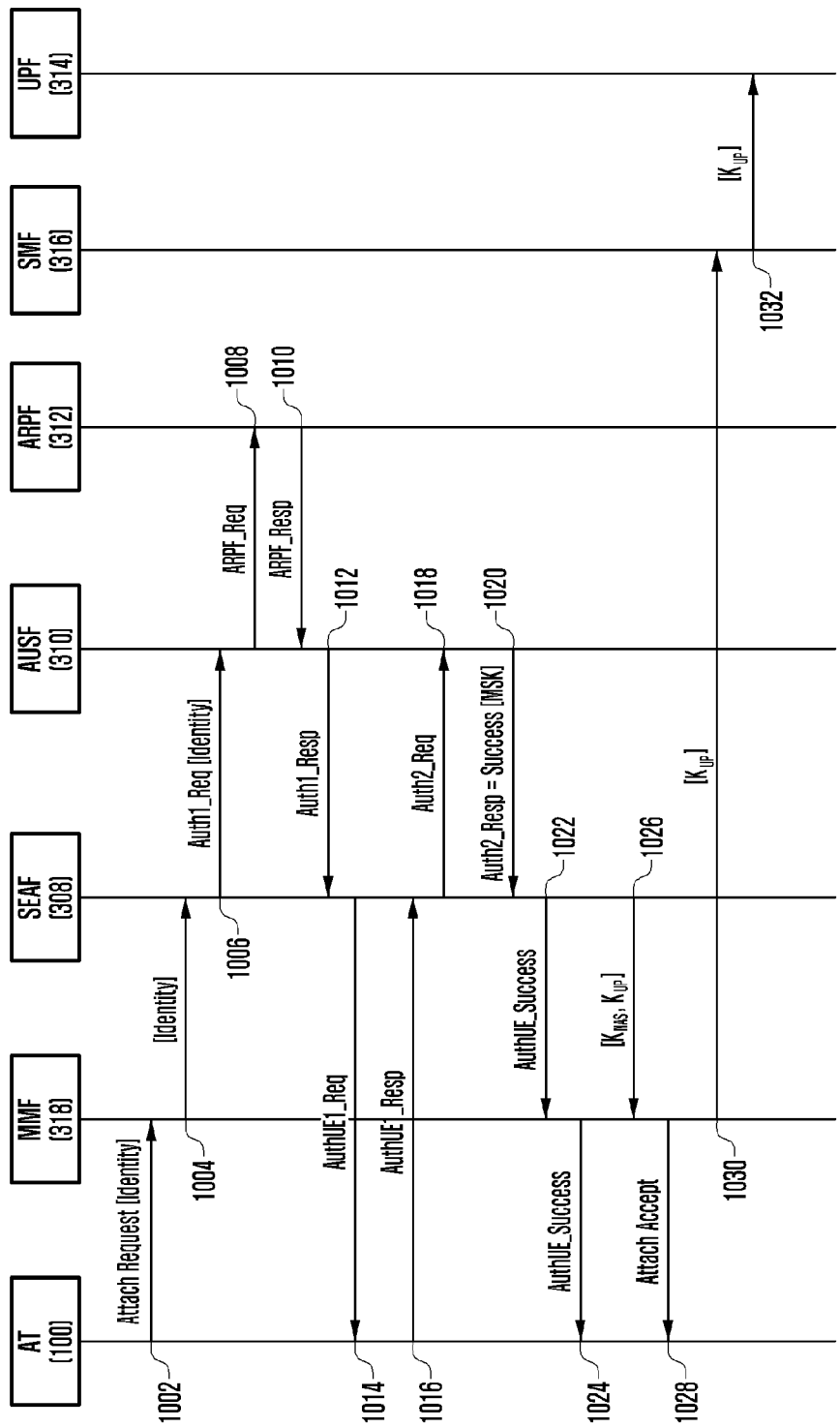
[Fig. 10]

[Fig. 11]
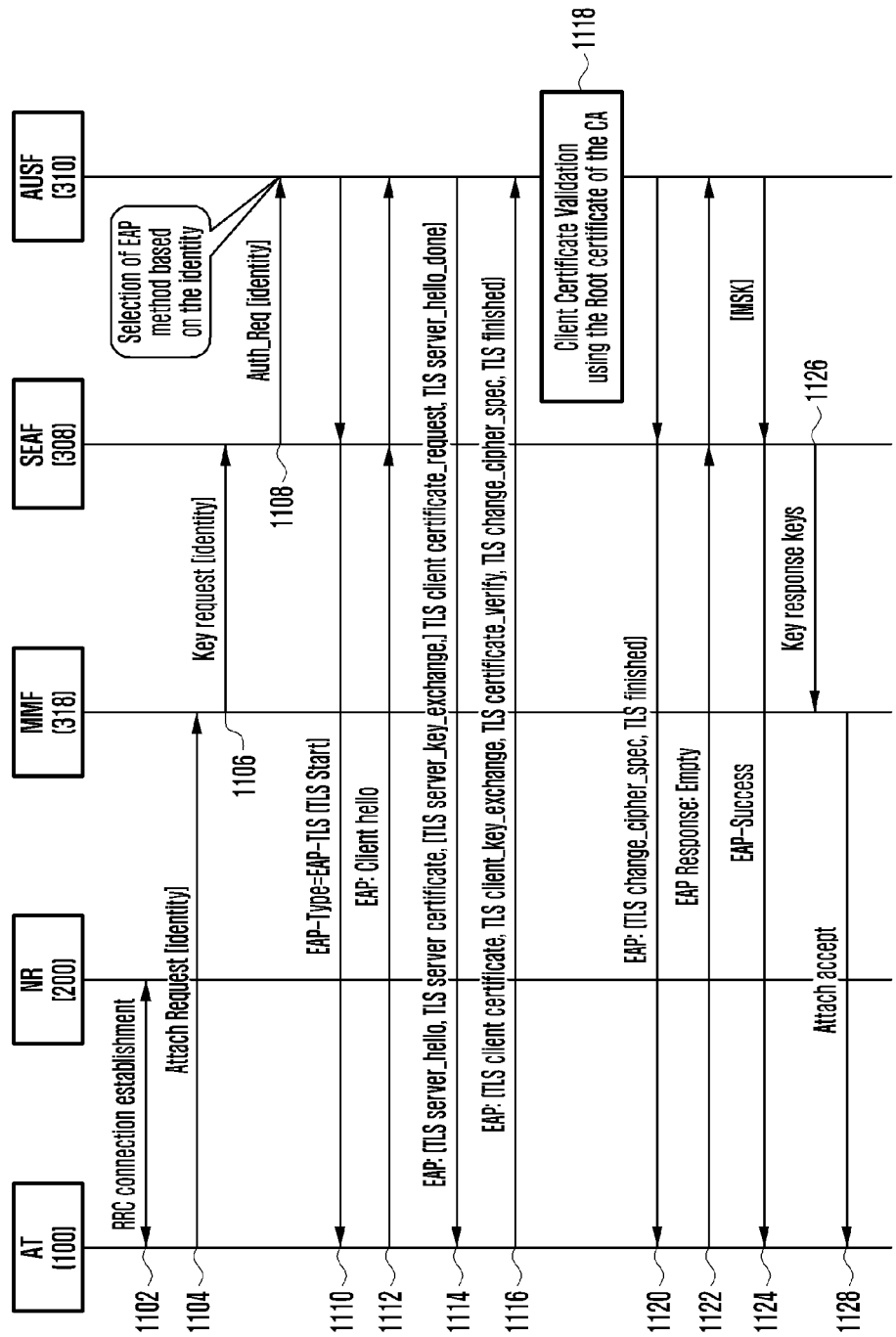

[Fig. 12]
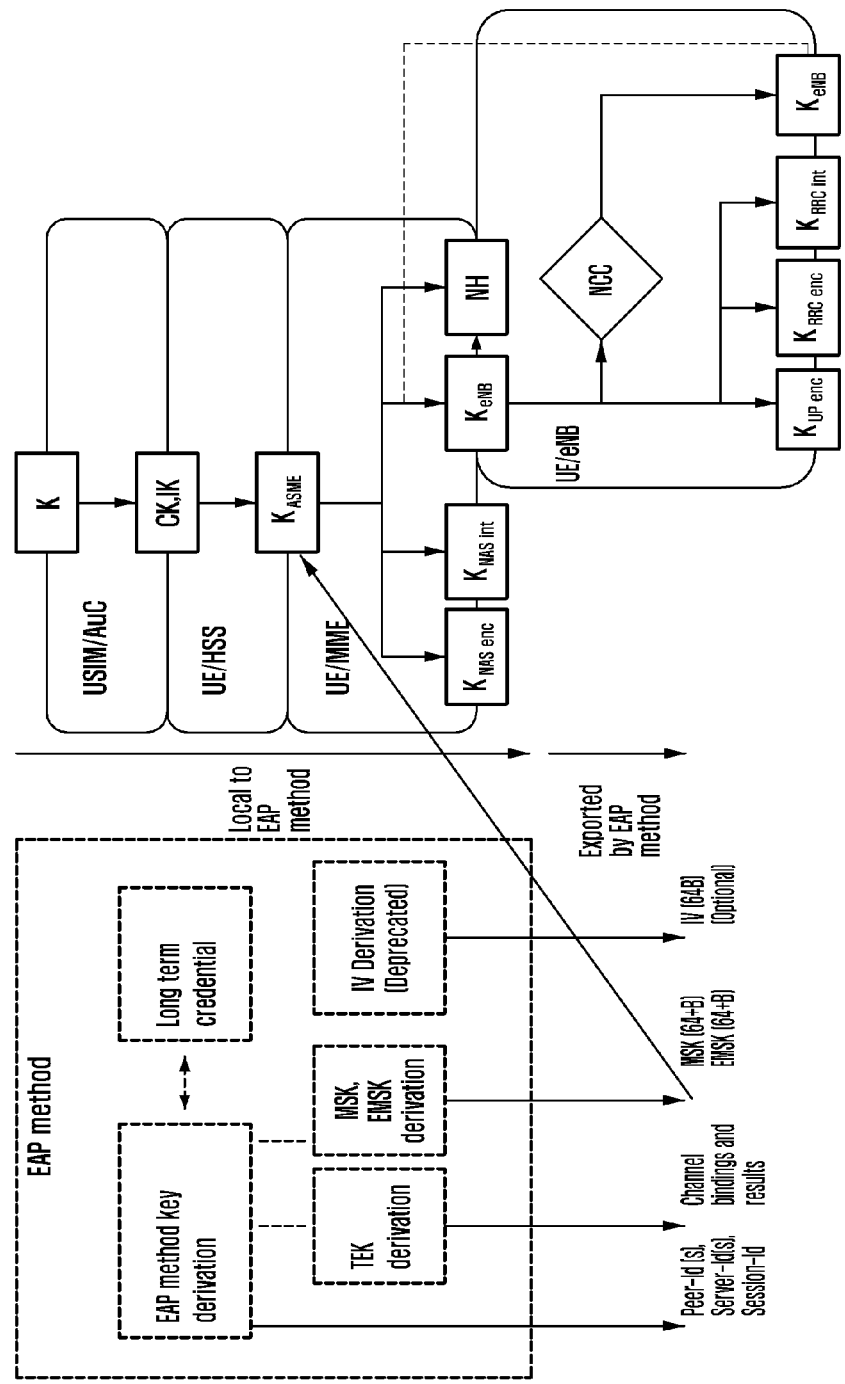

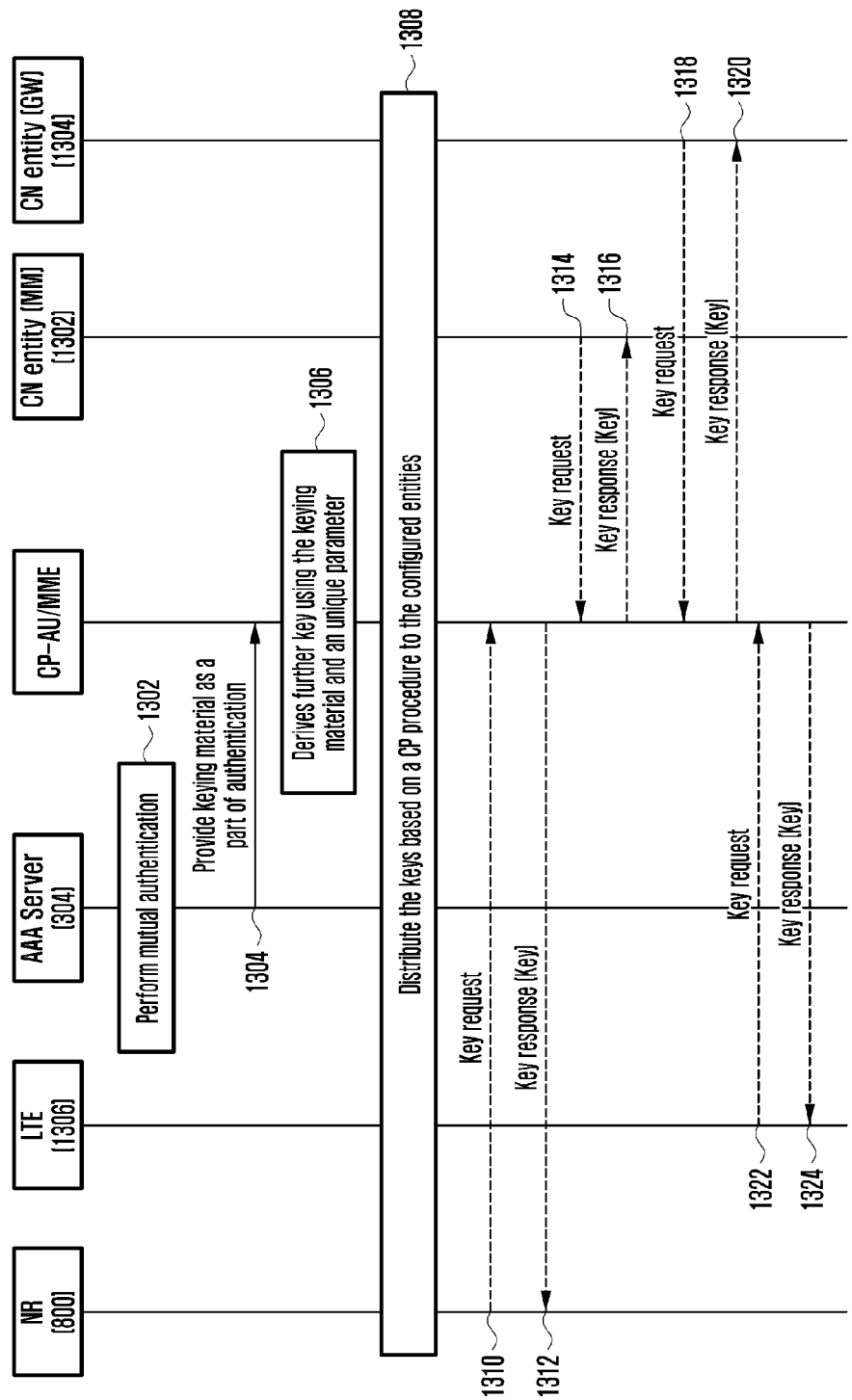
[Fig. 13]

[Fig. 14]
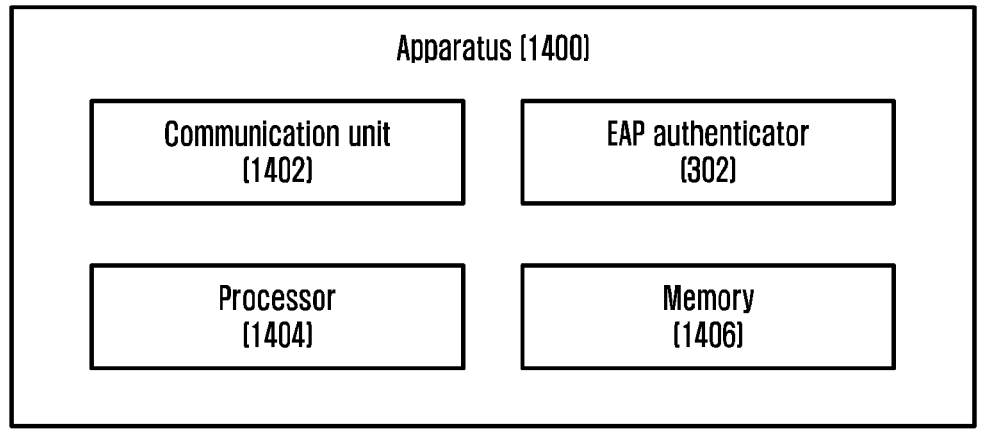
[Fig. 15]
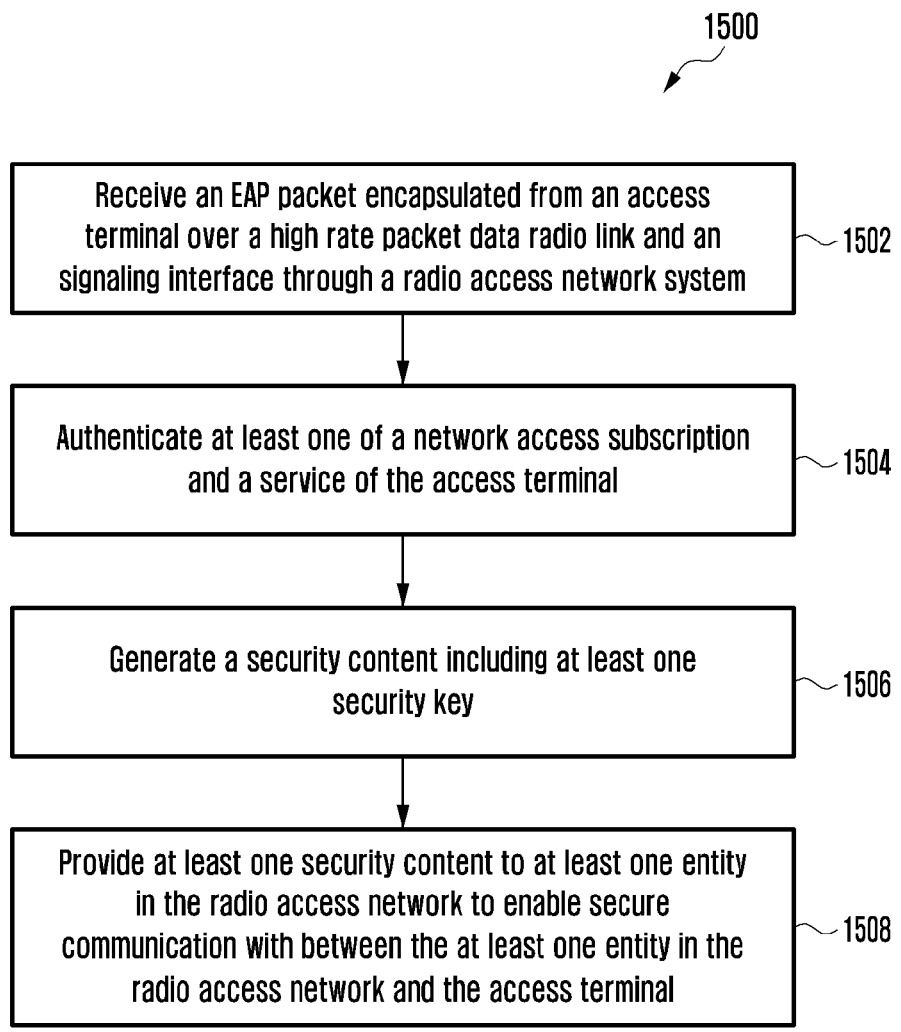

[Fig. 16]
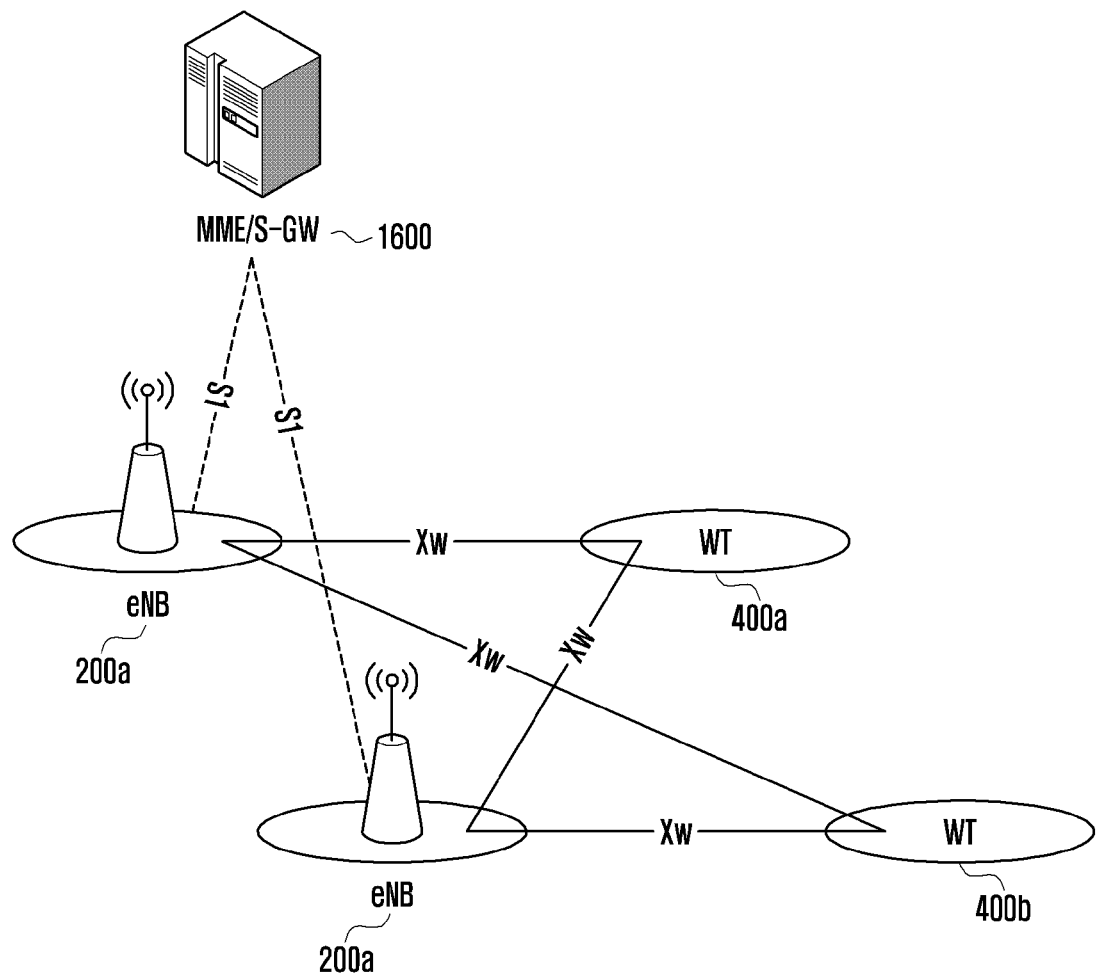

[Fig. 17]
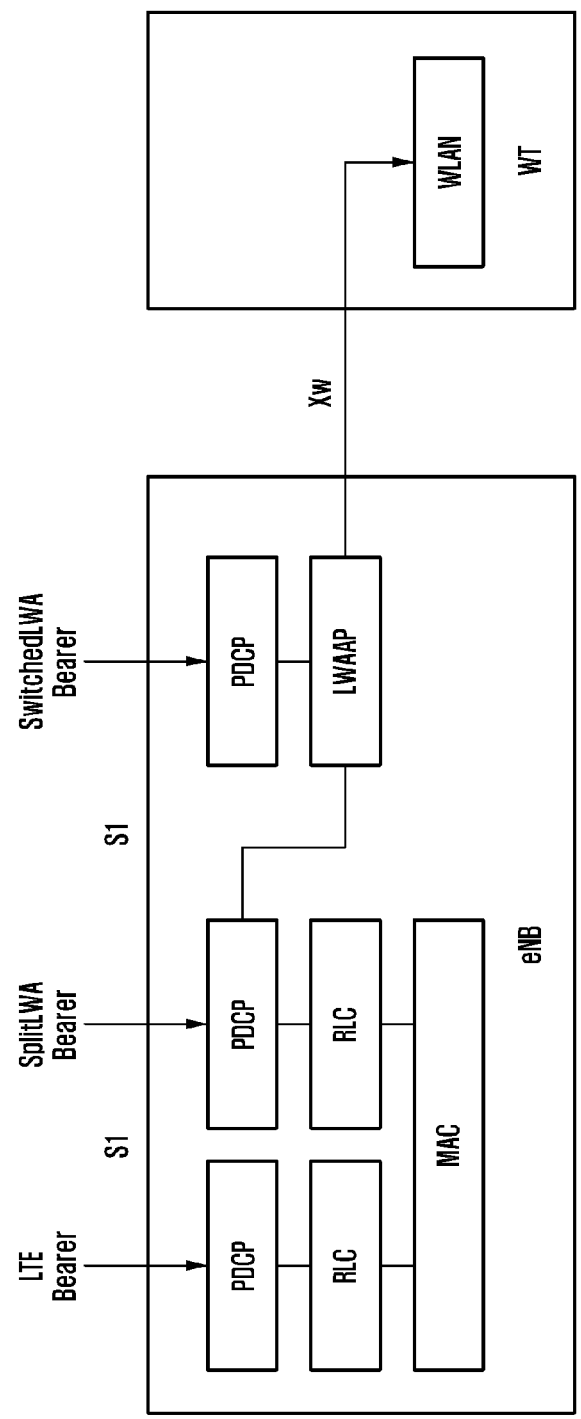

[Fig. 18a]
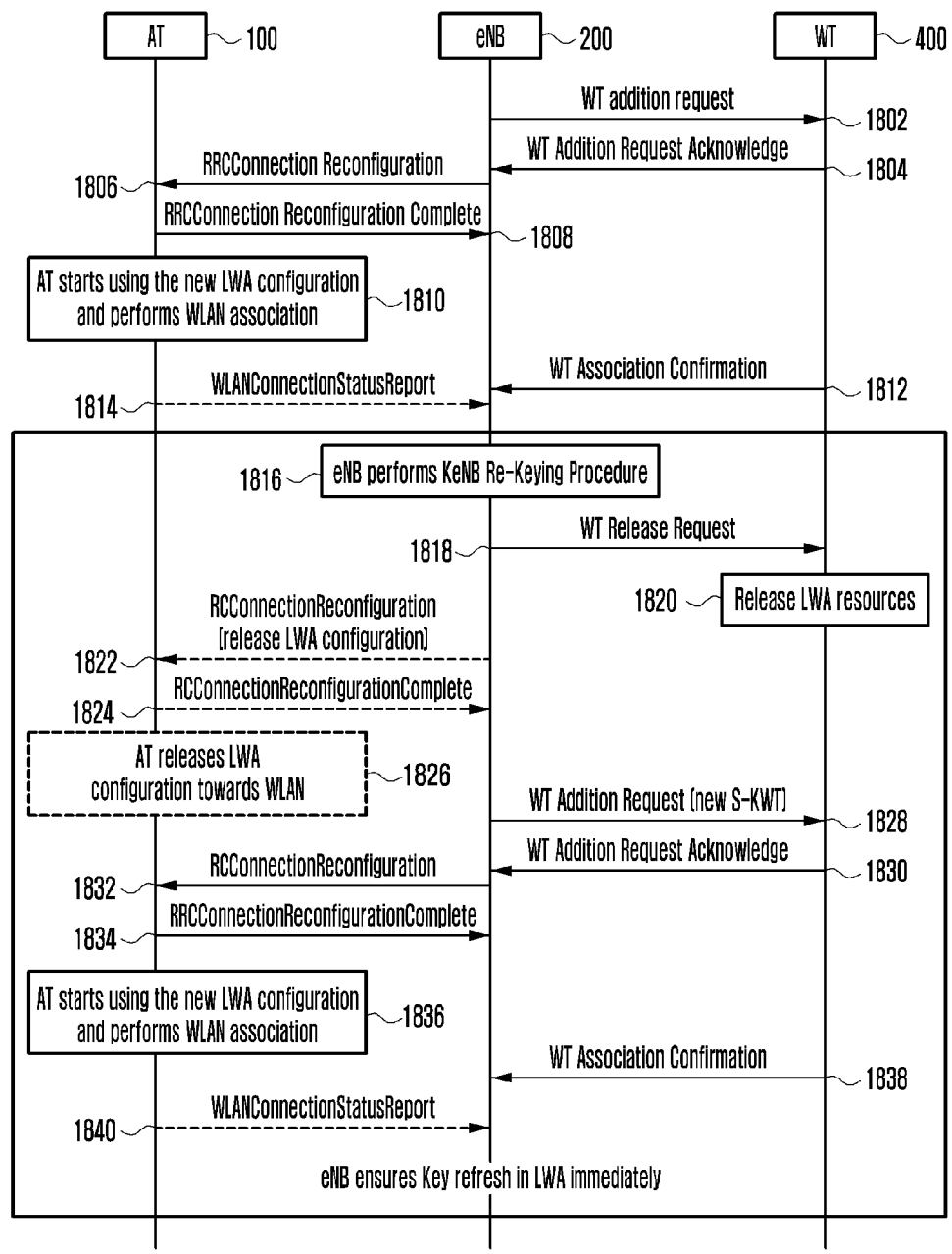

[Fig. 18b]
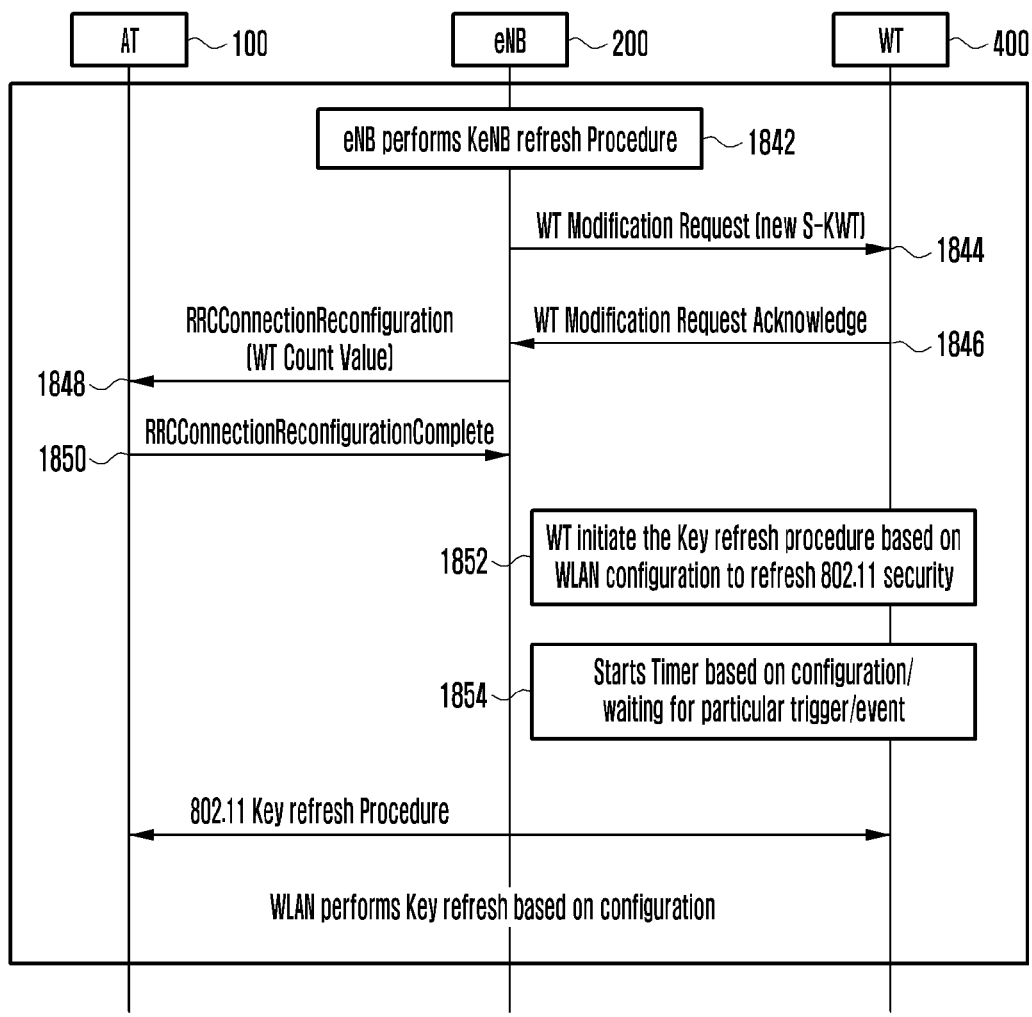

[Fig. 19a]
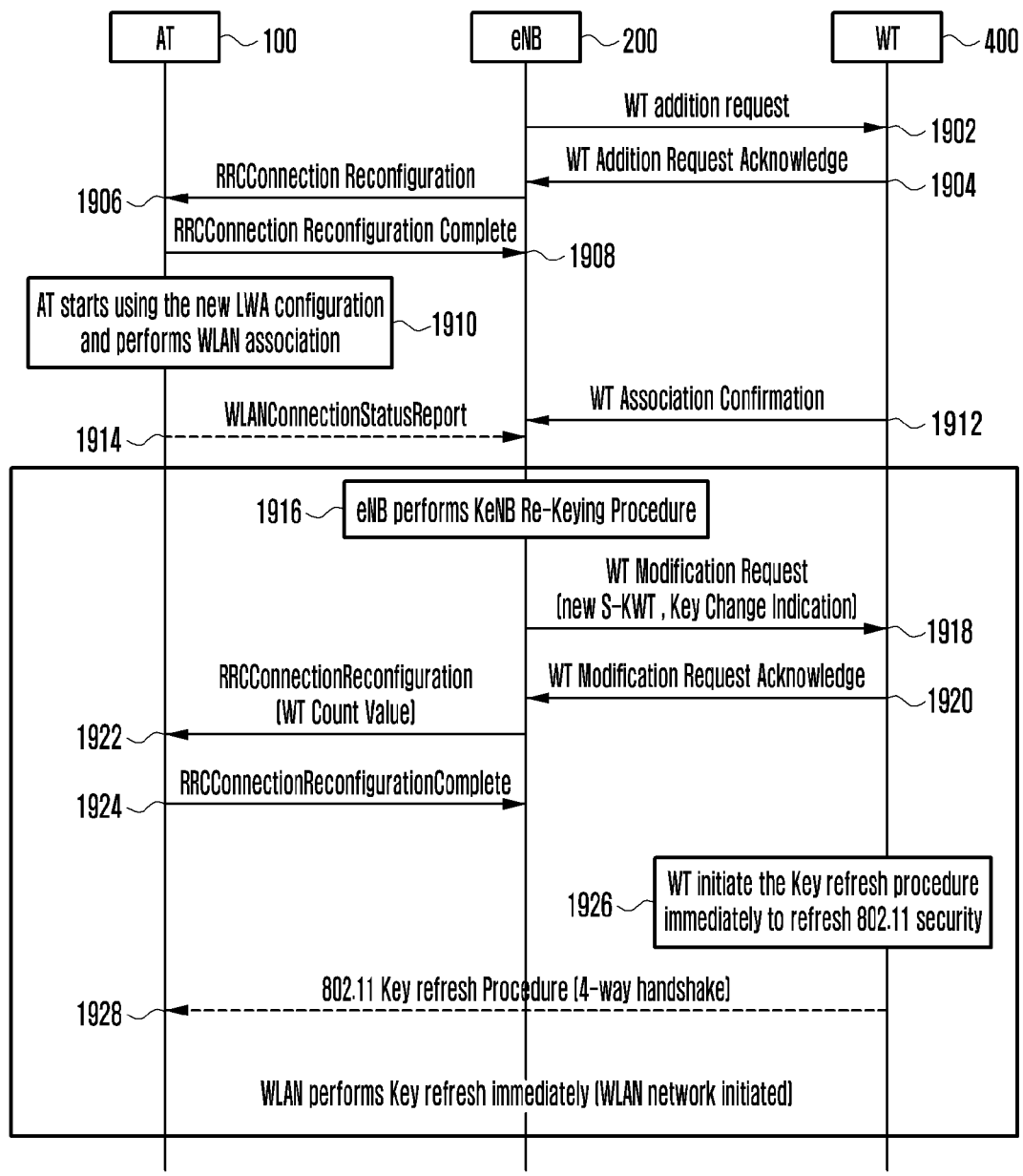

[Fig. 19b]
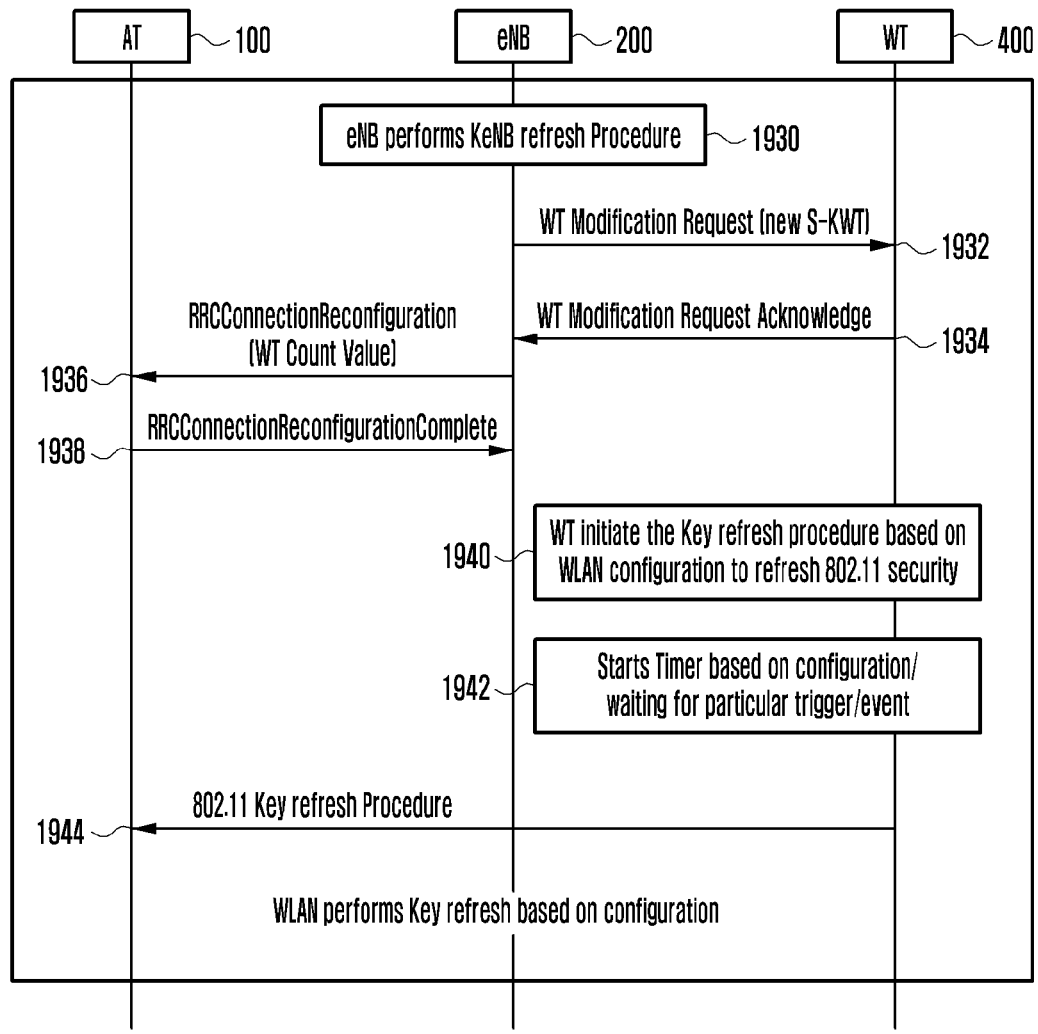

[Fig. 20a]
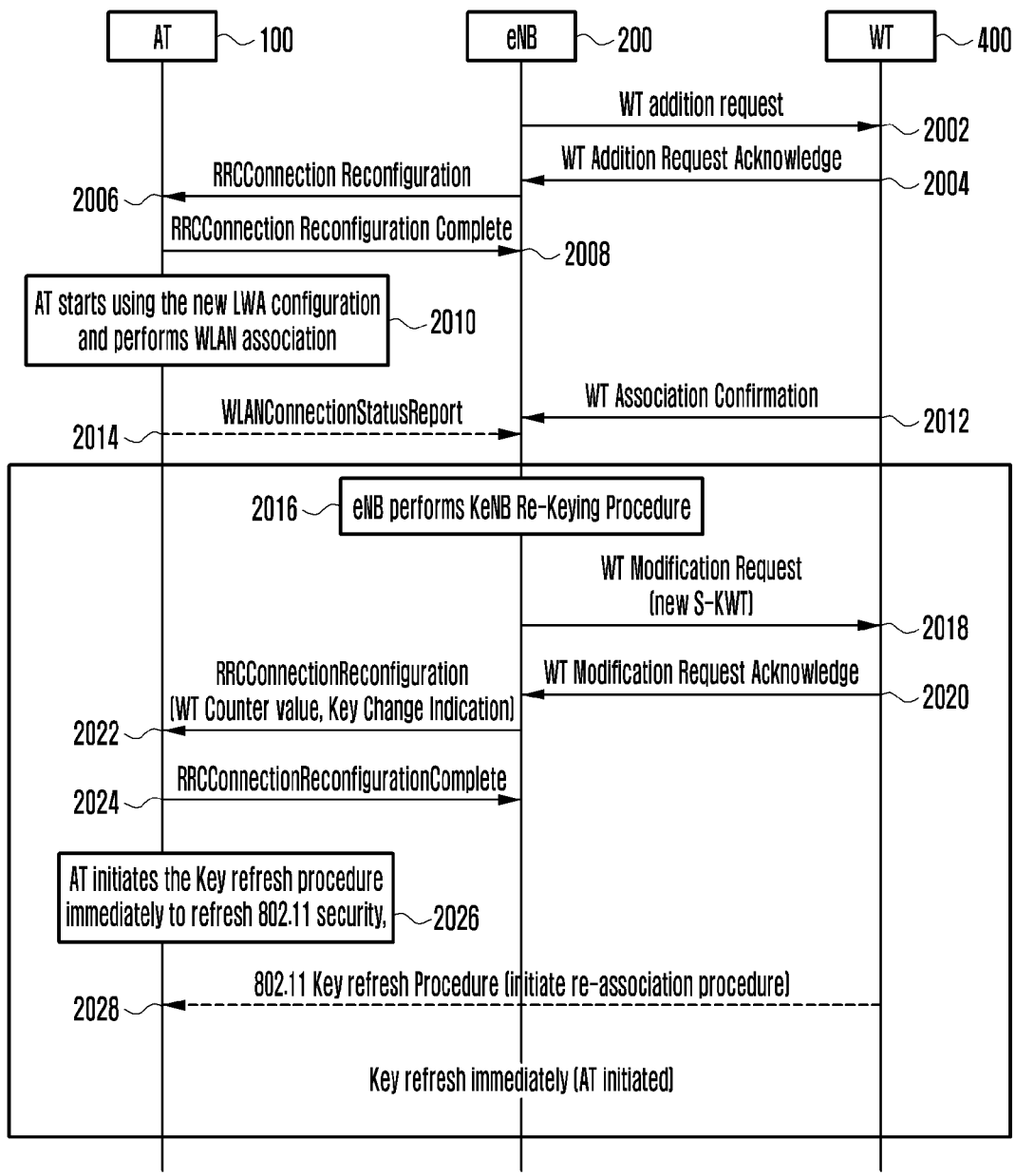

[Fig. 20b]
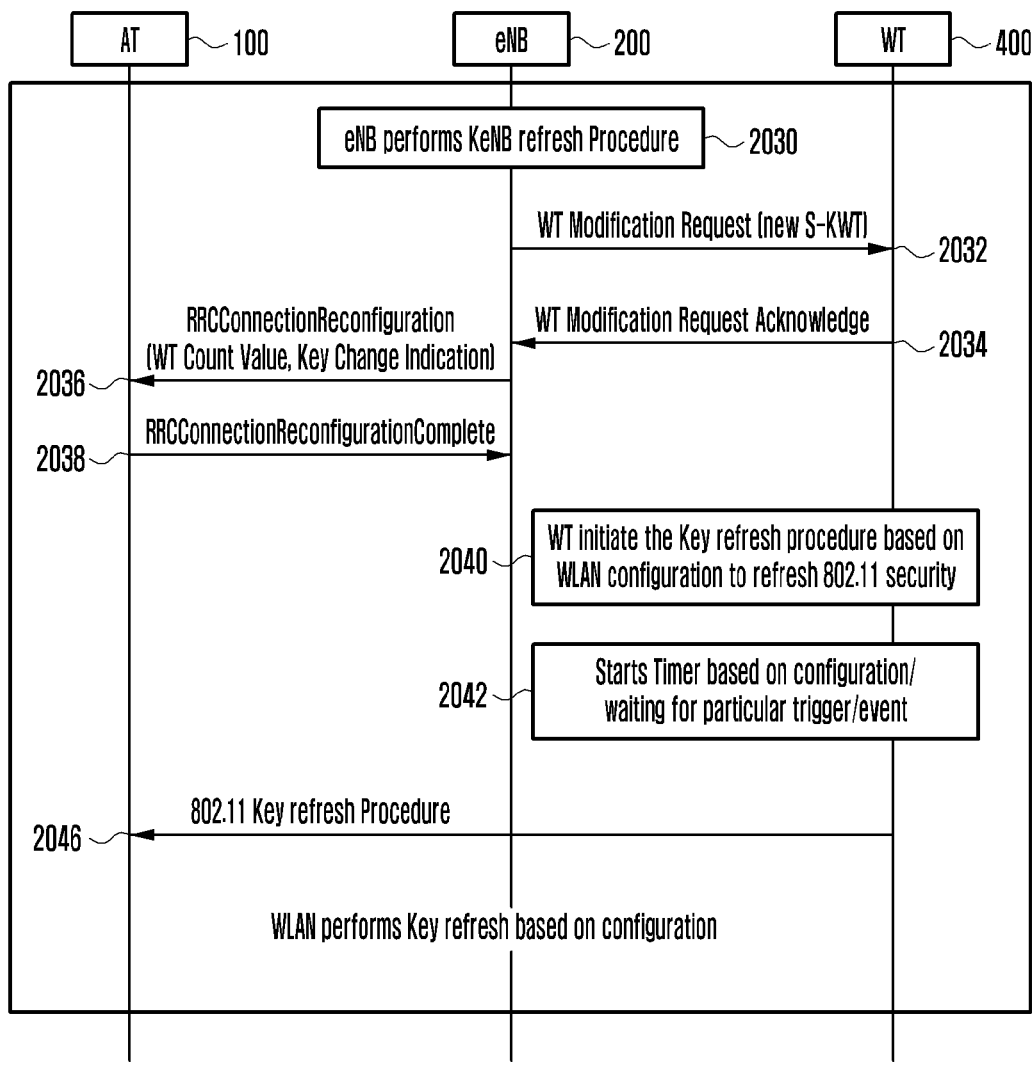

[Fig. 21a]
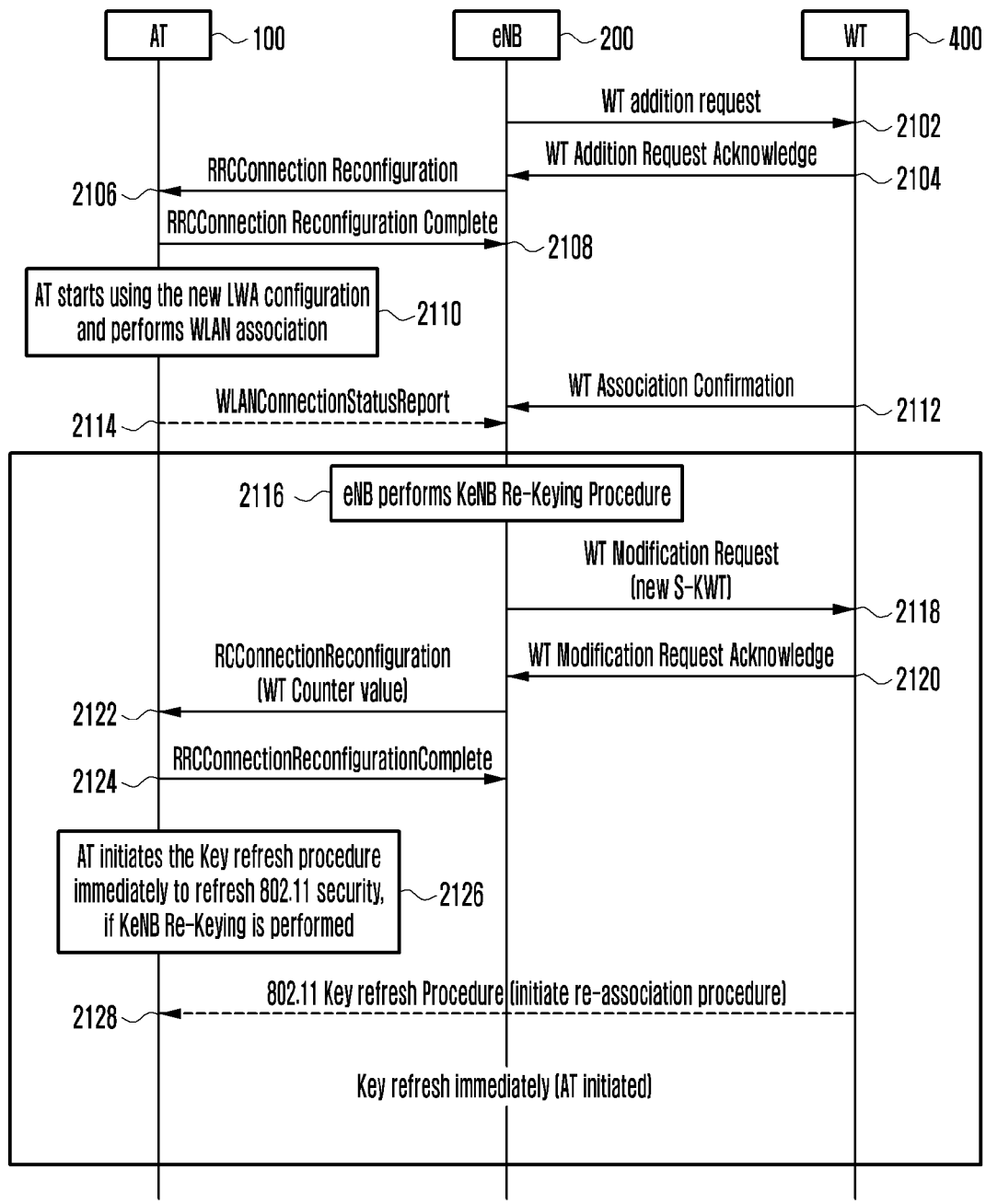

[Fig. 21b]
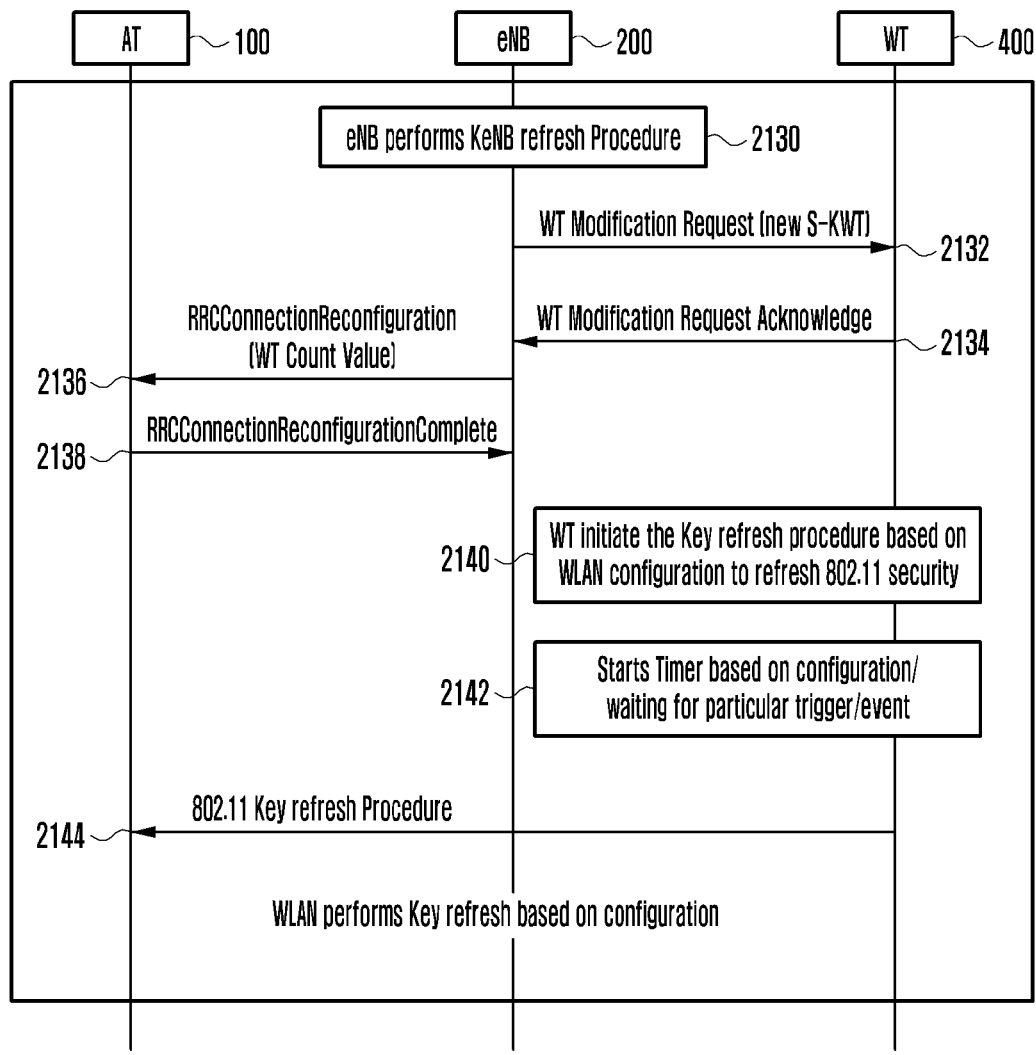

[Fig. 22a]
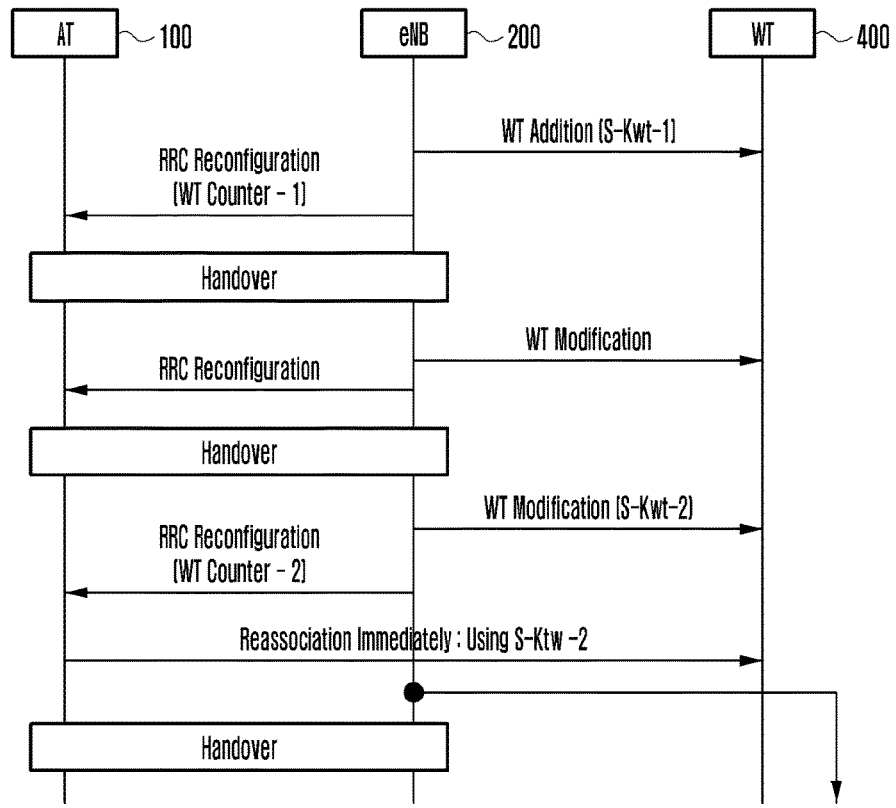
[Fig. 22b]
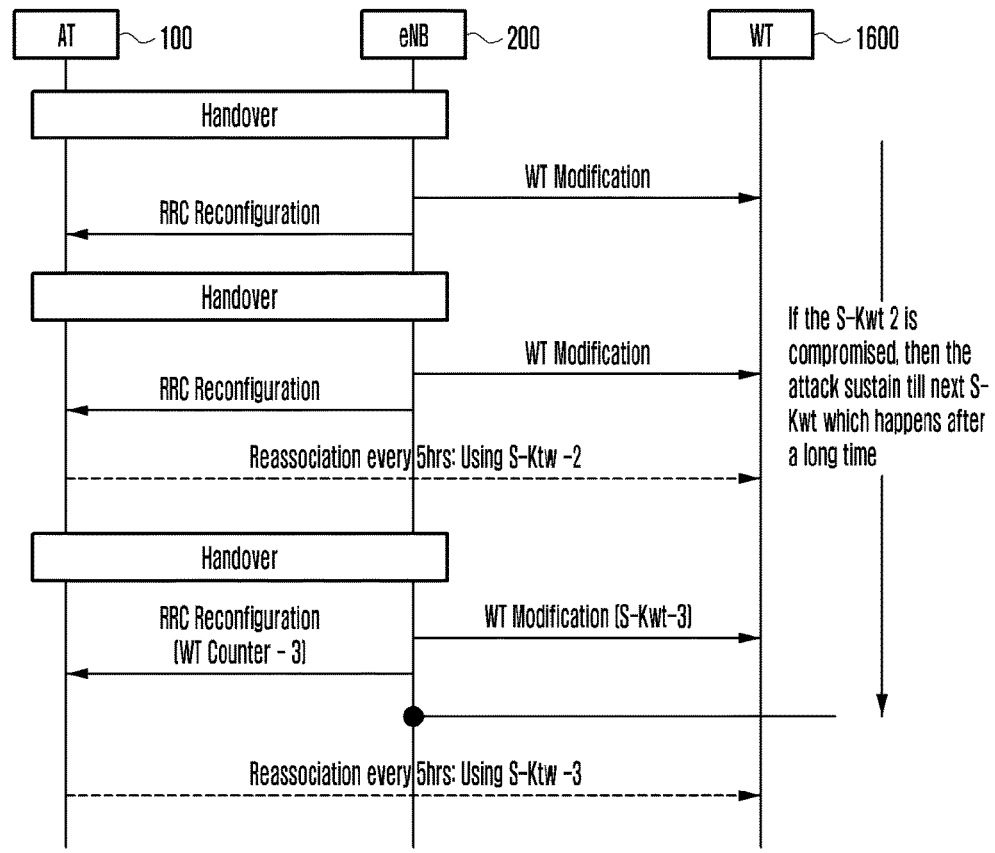

[Fig. 23a]
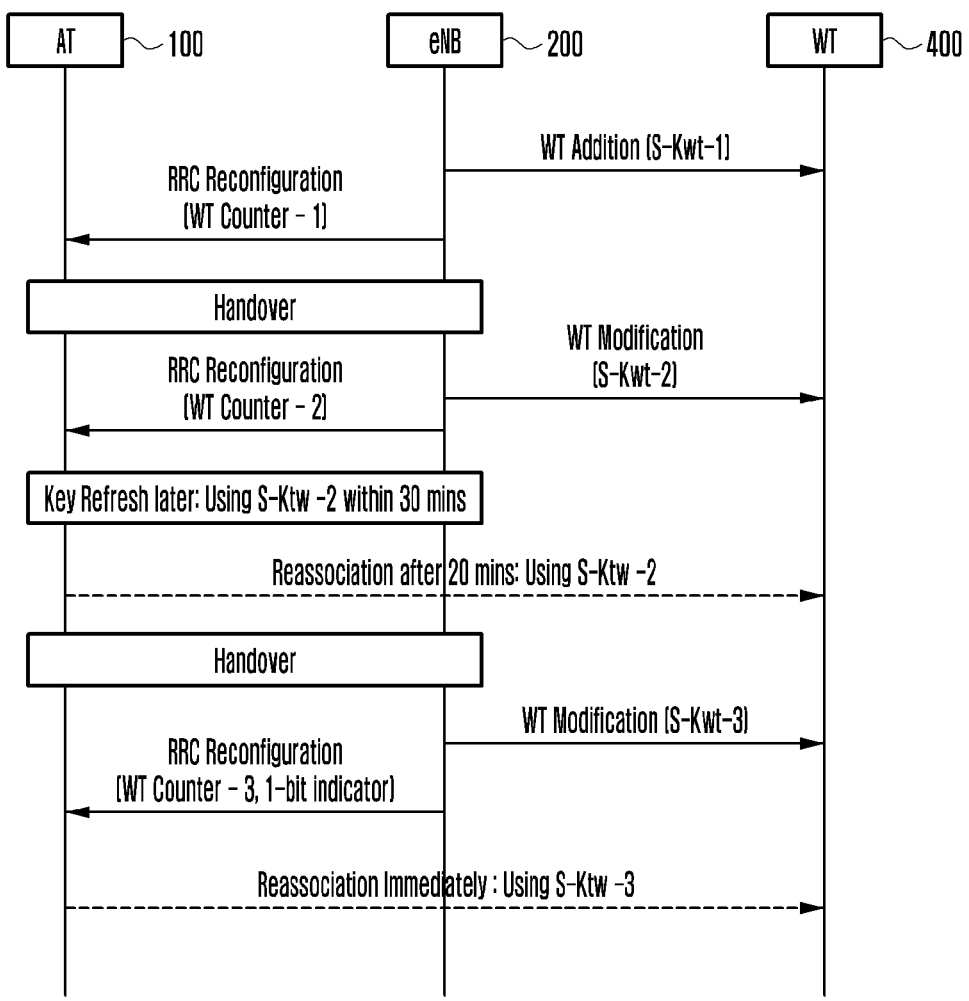

[Fig. 23b]
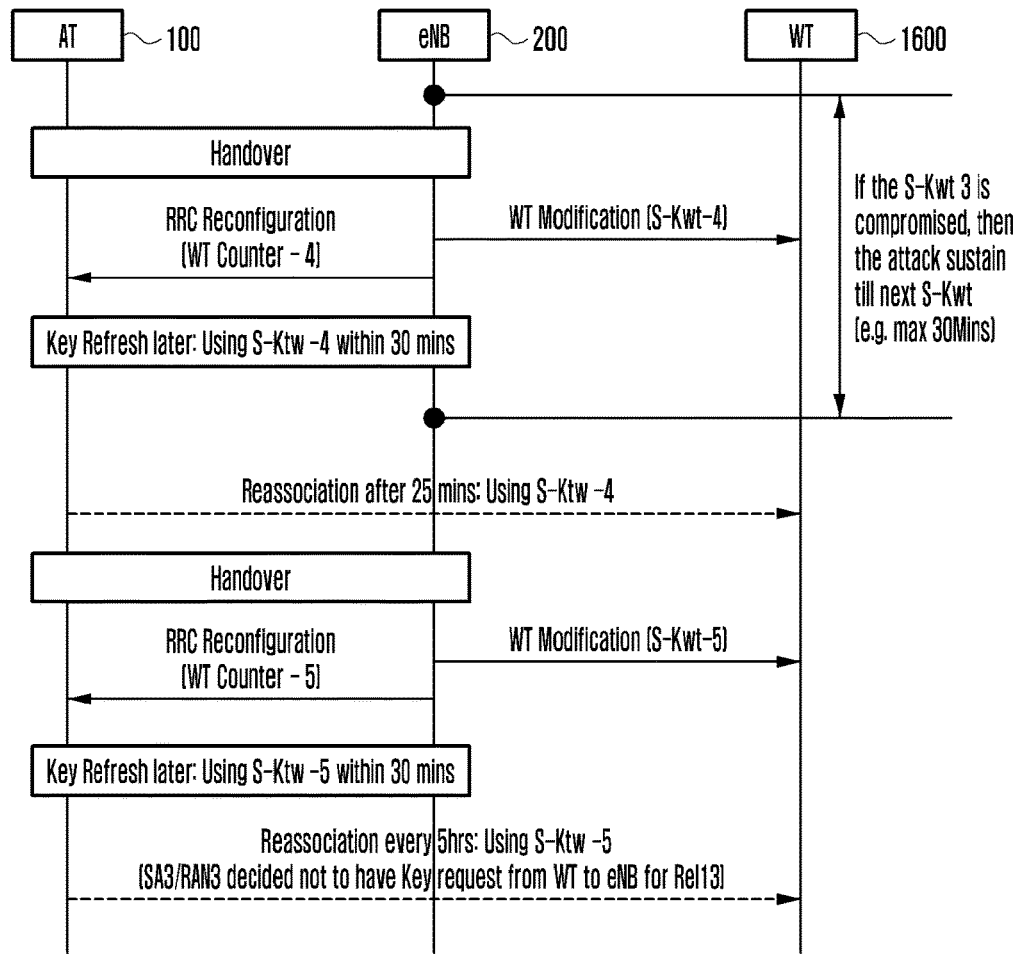
[Fig. 24]
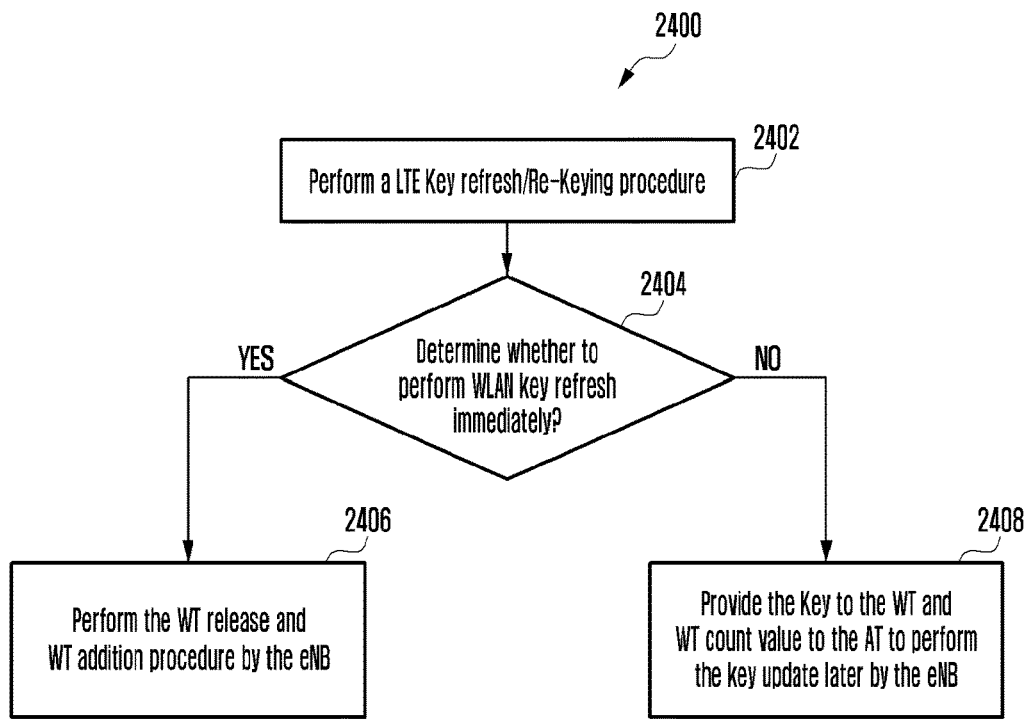

[Fig. 25]
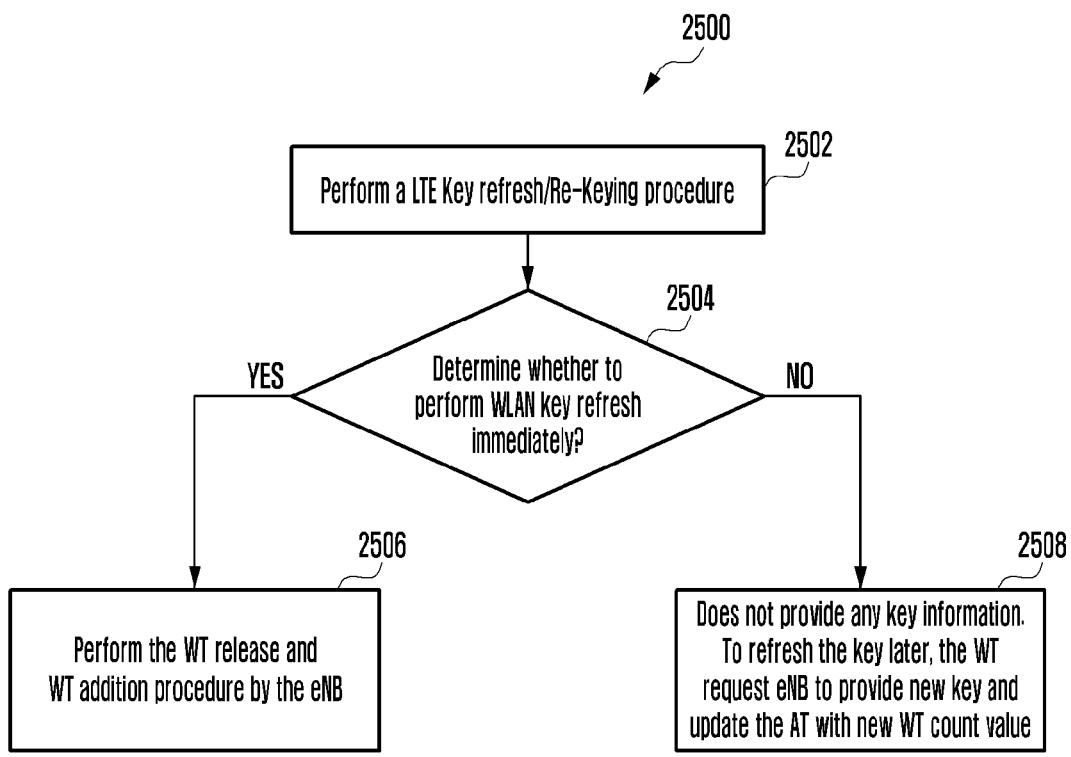

METHOD AND SYSTEM FOR AUTHENTICATING ACCESS IN MOBILE WIRELESS NETWORK SYSTEM

PRIORITY

This application is a National Phase Entry of PCT International Application No. PCT/KR2017/007190 which was filed on Jul. 5, 2017, and claims priority to Indian Provisional Patent Application Nos. 201641023119 and 201641025054, and Indian Non-Provisional Patent Application No. 201641023119, which were filed on Jul. 5, 2016, Jul. 21, 2016, and Jul. 3, 2017, respectively, the content of each of which is incorporated herein by reference.

TECHNICAL FIELD

The present application relates to a wireless communication, and more specifically to a method and system for authenticating access in a mobile wireless network system. The present application is based on, and claims priority from, both the Indian Application Numbers, 201641023119 filed on 5 Jul. 2016 and 201641025054 filed on 21 Jul. 2016, the disclosure of which is hereby incorporated by reference herein.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The $3^{rd}$ Generation Partnership Project (3GPP) initiated the work on "Next Generation Systems" which includes architecture and security for Next Generation System (FS_NextGen) and a 5G New Radio (NR) Access Technology (FS_NR_newRAT). A main objective of the work item is to design a system architecture for a next generation mobile network. The new architecture shall support at least the new radio access technologies (RAT(s)), the evolved LTE, non 3GPP access types and minimize access dependencies as per the standard, work item described in the 3GPP document SP-160227. The main requirements from security perspective for new Next Generation architecture are: "The 3GPP system shall support industrial factory deployment where a network access security is provided and managed by a factory owner with its ID management, authentication, confidentiality and integrity", and "The 3GPP system shall support an authentication process that can handle alternative authentication methods with different types of credentials to allow for different deployment scenarios such as industrial factory automation as per the standard study report of 3GPP TR 22.862. Further, in order to address the requirements from 3GPP SA WG1, the following principles are adopted by the architecture working group [TR 23.799]:

a. Support authentication of a user Equipment (UE) connecting to a 5G NextGenCore Network (CN) via different access network, including 3GPP technologies, non-3GPP wireless technologies, fixed broadband access, secure and unsecure Non-3GPP accesses.

b. The UE is assumed to possess credential. The procedure for providing credential to UE is out of scope of this solution.

c. Support a unified authentication framework enabling UEs connecting via different access network technologies to access the 5G NextGen CN.

Considering the above objective, requirements and the architectures under consideration [SP-160464], the current 3GPP system authentication mechanism does not provide lower-layer agnostic and is different from the non-3GPP systems (for example WLAN, like so).

In the current 3GPP systems (for example, LTE, Universal Mobile Telecommunications Service (UMTS), like so) the authentication mechanism is tightly coupled with a Non-access stratum (NAS) layer and require an exclusive hardware (e.g., Universal Integrated Circuit Card (UICC)) to store and execute the authentication protocol (AKA or SIM) in the UE. Further, the 3GPP system is required to have an authentication framework for the NextGen System (Next-Gen Core and NR radio access technology) which supports:
  Different credentials
  AKA (USIM)
  Certificate
  Password
  To support different scenarios
  Isolated Operations
  Initial credentials provisioning
  Accessing the EPC/NextGen Core via the unlicensed spectrum networks (for example, WLAN, LTE-U)
  Storage and execution of authentication protocols in different trusted platforms (for example, UICC/eUICC/SmartCards/Secure platform in the device (like KNOX))
  Interwork with the non-3GPP access networks via NextGen Core
  To use the same framework with different credentials and with different networks
  Vendor network/Service Provider network/application service provider network
  Devices supporting multiple RATs
  Further, in order to have unified authentication framework to address the requirements, specifically, "handle alternative authentication methods with different types of credentials", a new authentication framework is required.

Considering the limitation in the existing 3GPP systems and the requirements on NextGen, it is motivate to use Extensible Authentication Protocol (EAP) based authentication framework for NextGenSystems. However, when adopting the EAP, the following challenges needs to be addressed:
  EAP needs a way to encapsulate EAP messages within protocol's messages
  no longer access agnostic
  EAP authentication procedure may happen after IP address assignment.
  Existing EAP encapsulation protocols: EAPoL, 802.16e, IKEv2, PANA, RADIUS, DIAMETER are access technology
  EAPoL and 802.16e are particular MAC protocol specific
  Existing EPS-AKA authentication does not foresee any need to support generic framework to carry any other authentication protocol
  Need mechanisms to encapsulate EAP messages in the New Radio (NR) and NextGen Core
  A mechanism needs to be provided to transmit the Key from the authentication server to the authenticator and also to the other network entities that needs it from authenticator.
  Further design of architecture framework requires decision on the below two issues, if the EAP to be used as the authentication protocol:
  Locations for EAP authenticator (usually Authenticator placed at the first hop)
  In the NR node (Base Station)
  In the core network (CN) Node (CP-AU)
  EAP encapsulation protocols for Next Generation Networks
  EAP over RRC/NG2
  EAP over NAS
  EAP over PANA
  EAP over IKEv2

Further, in Rel-13 (Release-13), as part for a Work Item (RP-151114) "LTE-WLAN Radio Level Integration and Inter-working Enhancement", 3GPP finalized standardization of LTE WLAN Aggregation (LWA): LTE-WLAN Aggregation. In the LWA, the LTE Radio Access Network (RAN) aggregates a traffic over the LTE and WLAN radio interfaces, very similar as is performed in the Rel-12 Dual-Connectivity (DC): MeNB (Master eNB) is LTE RAT (Radio Access Technology), SeNB (Secondary eNB) is also LTE RAT and X2 interface between the MeNB and the SeNB. In the LWA: the eNB is LTE RAT, SeNB is called Wireless Termination (WT) and is handling WLAN RAT entities; interface between the eNB and the WT is called Xw. The 3GPP TS 36.300 provides more details DC and LWA, as shown in the FIG. 16, which is from the TS 36.300 specification.

The LWA in Rel-13 only supports Down Link (DL) data traffic over the WLAN. The LWAAP (3GPP TS 36.360) is a very small protocol only adding a packet header to a Packet Data Convergence Protocol-Protocol Data Unit (PDCP PDU) identifying a data radio bearer (DRB) the packet belongs to: Based on the received DRB-ID, the UE will know to which PDCP entity in the UE to deliver the packet to (UE has one PDCP entity per DRB). The PDCP PDU's going over WLAN are ciphered twice: Once on PDCP level by the eNB (normal LTE ciphering based on the key KeNB [TS 33.401]) and once on the WLAN level based on key S-KWT (used as PMK/PSK [IEEE 802.11]) which is derived from the KeNB. In order to limit the complexity (e.g. w.r.t. when/how to update S-KWT when handover occurs), the Rel-13 LWA specifies that any LWA configuration (i.e. WLAN part) is released at the LTE handover and if required it is added again after the handover (using WT addition procedure).

In Rel-14, a new WID "enhanced LWA" is approved to enhance the Rel-13 LWA solution (cf. RP-160600). Two main objectives of this WID are: support of UL data transport over the WLAN and support for an intra- and inter-eNB handover without WT change. The result of these two new objectives is that now have to consider what happens at intra/inter-eNB change, which results in KeNB change, with the data going over WLAN.

DISCLOSURE OF INVENTION

Technical Problem

However, the conventional methods does not disclose about any methods whether to change the key S-KWT (SeNB—Wireless Termination) whenever KeNB (eNB Key changes for every handover) changes. Further, if changes need to be performed, then the S-KWT key change has to be performed immediately or later for every KeNB change. Also, if it is not required to change the S-KWT for every KeNB immediately, then the eNB needs to have the knowledge to decide on what events the S-KWT to be changed later and on what events it need to be changed immediately. Further, whether to provide the S-KWT to the WT for every KeNB. Also, if the change of S-KWT is not required for every KeNB immediately, then the prior art appears to not disclose how to handle the S-KWT refresh in WLAN by the eNB.

While supporting high data rate in the WLAN RATs (802.11ad), frequent change of Keys (WLAN Keys) in WLAN AN (due to change in KeNB in LTE) leads to QoE degradation. The need for change in WLAN keys is questionable and from performance perspective, it is recommended not to change the key often immediately with the frequency of change of the key in the LTE, but later. However, it is required to have a method on, when and how to change the key independently. To adhere security principles, change in a root key should change all derived keys, however acceptable to change the WLAN key later, provided PDCP ciphering take care of any security risks. However, there are considerations on whether the PDCP layer ciphering can be relaxed as to avoid the complexity by ciphering at multiple entities. If the PDCP layer ciphering is relaxed or if PDCP layer ciphering is performed, the outcome of S-KWT when the KeNB is changed need to be identified. Also, there is a need to decide whether the key S-KWT needs to be changed immediately at the handover or later point of time. In LTE, the KeNB change (refresh/re-keying) is achieved by performing inter/intra cell handover. The above detailed Key refresh issue is applicable for both the LTE-WLAN interworking and also for 5G NR-WLAN interworking.

Thus, it is desired to address the above mentioned disadvantages or other shortcomings or at least provide a useful alternative.

Solution to Problem

Embodiments herein disclose a method for authenticating access in a mobile wireless network system. The method includes receiving by an Extensible Authentication Protocol (EAP) authenticator an EAP packet encapsulated from an access terminal over a high rate packet data radio link and a signaling interface through a radio access network. The EAP packet is encapsulated over at least one of a Non-Access Stratum (NAS) interface, a Radio Resource Control (RRC) interface and a N1 interface. The EAP authenticator is located at a secured node in a core network of the radio access network, to handle the master key more securely. Further, the method includes authenticating by the EAP authenticator at least one of a network access subscription and a service of the access terminal.

In an embodiment, the method further includes generating by the EAP authenticator a security content comprising at least one security key. Further, the method includes providing at least one security to at least one entity in the radio access network to enable secure communication between the at least one entity in the radio access network and the access terminal.

In an embodiment, the EAP packet is encapsulated using an EAP encapsulation protocol.

In an embodiment, the EAP encapsulation protocol includes at least one of RRC protocol, N2 signaling protocol, NAS protocol, and signaling Protocol between the access terminal and a Security Anchor Function (SEAF) entity.

In an embodiment, the secure node is at least one of a SEAF entity, an Authentication Management Field (AMF) entity and an Authentication Server Function (AUSF) entity.

In an embodiment, an entity of the radio access network relays the EAP packet from the access terminal to the EAP authenticator.

In an embodiment, the radio access network is at least one of a 5G Core network (5GC), a NG Radio Access Network (NG-RAN), an Evolved Packet Core (EPC), a Long Term Evolution (LTE) system and a next generation network system.

In an embodiment, the EAP authenticator (e.g., SEAF) authenticates the access terminal through an AMF entity. In an embodiment, the AMF entity interfaces with an AUSF entity to carry out the authentication.

In an embodiment, the EAP authenticator functionality is distributed among different entities in the 5G network system.

In an embodiment, the EAP authenticator functionality is distributed among different entities in the 5G network system, where the security termination is performed by the access network entity and also the AMF/SEAF entity.

In an embodiment, the EAP authenticator functionality is distributed among the entities in the radio access network, where a security termination is performed by at least one of the access network entity, the AMF, the gNB, the NR NodeB, the Evolved Node B (eNB) and the SEAF entity.

In an embodiment, the EAP authenticator functionality is distributed among different entities in the 5G network system, where the security termination is performed by the AMF, and the AMF and the SEAF are separate entities.

In an embodiment, the EAP authenticator functionality is distributed among different entities in the 5G network system where the authentication is initiated by the SEAF/AMF.

In an embodiment, the EAP authenticator functionality is distributed among different entities in the 5G network system, where the authentication is initiated by the SEAF, and the AMF and the SEAF are separate entities.

In an embodiment, the EAP authenticator functionality is distributed among different entities in the 5G network system by routing of the EAP packets to appropriate EAP server by the AMF/SEAF.

In an embodiment, the EAP authenticator functionality is distributed among different entities in the 5G network system by routing of the EAP packets to appropriate EAP server by the SEAF, where the AMF and the SEAF are separate entities.

In an embodiment, the EAP authenticator functionality is distributed among different entities in the 5G network system, where the SEAF receives the master key, derives further keys and distributes the keys to other network entities.

In an embodiment, the EAP authenticator functionality is distributed among different entities in the 5G network system where the AMF entity performs the bridging of the access technology specific EAP encapsulation protocol and the Diameter/Radius protocol.

In an embodiment, the EAP authenticator functionality is distributed among different entities in the 5G network system where access control of the Access Terminal (AT) is performed by the Radio access network entity (gNB).

In an embodiment, the registration procedure is used to trigger the authentication procedure by the AT with the network, when the AT does not have a valid security context or when the AT needs to perform only the authentication procedure. The Registration procedure include the registration type as one of the following: initial registration and authentication procedure.

In an embodiment, the keys are fetched from the SEAF by the network entities when the UE request for the network access.

Embodiments herein disclose an apparatus for authenticating access in a mobile wireless network system. The apparatus includes an EAP authenticator coupled to a memory and a processor. The EAP authenticator is configured to receive an EAP packet encapsulated from an access terminal over a high rate packet data radio link and a signaling interface through a radio access network. The EAP packet is encapsulated over at least one of a Non-Access Stratum (NAS) interface, a Radio Resource Control (RRC) interface, and N12 interface. The EAP authenticator is located at a secured node in a core network of the radio access network. The EAP authenticator is configured to authenticate at least one of a network access subscription and a service of the access terminal.

Embodiments herein disclose a system for authenticating access in a mobile wireless network system. The system includes an access terminal in a first radio access network, a radio access network entity, and an EAP authenticator communicating with the access terminal through the radio access network entity. The EAP authenticator is located at a secure node in a second radio access network. The EAP authenticator is configured to receive the encapsulated EAP packet from the access terminal over the high rate packet data radio link. The EAP packet is encapsulated over at least one of a NAS protocol, a RRC protocol, and a N12 interface. The EAP authenticator is configured to authenticate at least one of a network access subscription and a service of the access terminal.

In an embodiment, the second radio access network is a next generation core network of the first radio access network.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

According to an embodiment of the present invention, it is possible to solve the QoE degradation problem because of frequent change of Keys in WLAN while supporting high data rate in the WLAN RATs.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 1 is a schematic diagram illustrating an overview of a system for authenticating access in a mobile wireless network system, according to the embodiments as disclosed herein;

FIG. 2 is a schematic diagram illustrating an overview of a system for authenticating access in the mobile wireless network system, where the system includes a 3GPP access network, a core network, and a non-3GPP access network, according to the embodiments as disclosed herein;

FIG. 3 is a schematic diagram illustrating an overview of a system for authenticating access in the mobile wireless network system, where the system includes the 3GPP access network, the core network, and a third party domain, according to the embodiments as disclosed herein;

FIGS. 4 and 5 are illustrating schematic diagrams of a system for authenticating access in the mobile wireless network system, where the system includes a NextGen home network and a NextGen visited network, according to the embodiments as disclosed herein;

FIG. 6a illustrates an EAP based authentication framework based on a EAP over a RRC and the EAP over a NG1-C/S1-C, according to the embodiments as disclosed herein;

FIG. 6b illustrates the EAP based authentication framework based on the EAP over a NAS, according to the embodiments as disclosed herein;

FIG. 6c illustrates the EAP based authentication framework based on the EAP over a PANA/IKEv2, according to the embodiments as disclosed herein;

FIG. 7a illustrates the EAP over PC5-C, RRC and EAP over NG1-C/S1-C for a NR Relay (NRR) scenario, according to the embodiments as disclosed herein;

FIG. 7b illustrates the EAP over the NAS for the NRR scenario, according to the embodiments as disclosed herein;

FIG. 7c illustrates the EAP over PANA/IKEv2 for the NRR scenario, according to the embodiments as disclosed herein;

FIG. 8a illustrates a sequential flow diagram illustrating an authentication procedure during initial attach procedure, according to the embodiments as disclosed herein;

FIG. 8b is a sequential flow diagram illustrating a step by step procedure involved for performing the separate authentication to support a unified authentication framework, according to the embodiments as disclosed herein;

FIG. 9 illustrates a sequential flow diagram illustrating step by step procedure involved for performing a EAP-TLS by a non-human IoT deployment, according to the embodiments as disclosed herein;

FIG. 10 illustrates a sequential flow diagram illustrating an authentication procedure during initial attach procedure using a NG1 interface, according to the embodiments as disclosed herein;

FIG. 11 illustrates a sequential flow diagram illustrating step by step procedure involved for performing the EAP-TLS by the non-human IoT deployment using the NG1 interface, according to the embodiments as disclosed herein;

FIG. 12 illustrates a key mapping procedure, according to the embodiments as disclosed herein;

FIG. 13 illustrates a key distribution flow in the mobile wireless network system, according to the embodiments as disclosed herein;

FIG. 14 is a block diagram of various hardware elements of an apparatus for authenticating access in the mobile wireless network system, according to the embodiments as disclosed herein;

FIG. 15 is a flow diagram illustrating a method for authenticating access in the mobile wireless network system, according to the embodiments as disclosed herein;

FIG. 16 is a schematic view of a non-collated LWA (LTE WLAN Aggregation) overall architecture, according to the prior art;

FIG. 17 is a block diagram of a LWA Radio Protocol Architecture for the collocated scenario, according to the prior art;

FIG. 18a and FIG. 18b are sequence diagrams illustrating a step by step procedure for deciding and initiating a WT release and WT addition procedure to ensure a key change in a WLAN by the eNB, according to the embodiment as disclosed herein;

FIG. 19a and FIG. 19b are sequence diagrams illustrating a step by step procedure for initiating a 4-way Handshake immediately by the WT whenever the WT receives an indication from the eNB to perform a key change, according to the embodiment herein;

FIG. 20a and FIG. 20b are sequence diagrams illustrating a step by step procedure for initiating a WLAN re-association procedure immediately by the UE whenever the UE receives an indication from the eNB to perform the key change, according to the embodiment as disclosed herein;

FIG. 21a and FIG. 21b are sequence diagrams illustrating a step by step procedure for deciding and initiating the WLAN re-association procedure, based on LTE Key refresh/re-keying scenario, to perform key change by the UE, according to the embodiment as disclosed herein;

FIG. 22a and FIG. 22b are sequence diagrams illustrating a step by step procedure for explicit indication to perform the key change immediately by providing the key, according to the embodiment as disclosed herein;

FIG. 23a and FIG. 23b are sequence diagrams illustrating a step by step procedure for implicit indication to perform the key change immediately, according to the embodiment as disclosed herein;

FIG. 24 is a flow diagram illustrating a method for deciding and triggering the WLAN key update procedures by the eNB, according to the embodiment as disclosed herein; and FIG. 25 is a flow diagram illustrating a method for triggering the WLAN Key update procedures independently by the eNB and the WT, according to the embodiment as disclosed herein.

MODE FOR THE INVENTION

The principal object of the embodiments herein is to provide a method and system for authenticating access in a mobile wireless network system.

Another object of the embodiments herein is to receive, by an Extensible Authentication Protocol (EAP) authenticator, an EAP packet encapsulated from an access terminal.

Another object of the embodiments herein is to configure an EAP authenticator at a secured node in a core network of a radio access network, to handle the anchor key or master key more securely.

Another object of the embodiments herein is to encapsulate an EAP packet over a Non-Access Stratum (NAS).

Another object of the embodiments herein is to encapsulate an EAP packet over a Radio Resource Control (RRC).

Another object of the embodiments herein is to encapsulate an EAP packet over an N2 interface.

Another object of the embodiments herein is to authenticate by the EAP authenticator at least one of the network access subscription and a service of the access terminal.

Another object of the embodiments herein is to generate a security content including at least one security key.

Another object of the embodiments herein is to provide at least one security to at least one entity in the radio access network to enable secure communication with between the at least one entity in the radio access network and the access terminal.

Another object of the embodiments herein is to perform a security key change in a heterogeneous radio access technology aggregation.

Another object of the embodiments herein is to provide an option for an eNB to request the access terminal to perform a key change procedure immediately.

Another object of the embodiments herein is to provide an option for the eNB to request the access terminal to perform the key change procedure later based on a WLAN configuration.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The terms, User Equipment (UE), an Access Terminal (AT), NextGen UE (N-UE) are interchangeably used in this disclosure. The terms, SEAF unit, SEAF entity and SEAF are interchangeably used in this disclosure. The terms, AUSF unit, AUSF entity and AUSF are interchangeably used in this disclosure. The terms, ARPF unit, ARPF entity ARPF and a Unified Data Management (UDM) entity are interchangeably used in this disclosure. The terms, UPF unit, UPF entity and UPF are interchangeably used in this disclosure. The terms, SMF unit, SMF entity and SMF are interchangeably used in this disclosure. The terms, MMF unit, MMF entity, MMF, a Core Access and Mobility Management Function (AMF) entity, AMF unit and AMF are interchangeably used in this disclosure.

In this specification, the core network (CN) refers to both the new NextGencore and the enhanced EPC to support new radio (NR) or NG Radio Access Network (NG-RAN), which are interchangeably used throughout the specification. A CP-AU equivalent node in the EPC is a MME in this specification. The terms, the CP-AU node, an Authentication Management Field (AMF) entity, and the SEAF entity are interchangeably used in this disclosure. In this specification, the authentication refers to primary authentication. The purpose of the primary authentication procedures is to enable mutual authentication between the AT and the Core network and provide necessary keying material that is used between the AT and Core/Radio network in subsequent security procedures. In this specification, the 3rd party domain authentication refers to secondary authentication.

The embodiments herein disclose a method for authenticating access in a mobile wireless network system. The method includes receiving by an Extensible Authentication Protocol (EAP) authenticator an EAP packet encapsulated from an access terminal over a high rate packet data radio link and a signaling interface through a radio access network. The EAP packet is encapsulated over at least one of a NonAccess Stratum (NAS) protocol, a Radio Resource Control (RRC) protocol and a N12 interface. The EAP authenticator is located at a secured node in a core network of the radio access network. Further, the method includes authenticating by the EAP authenticator (primary authentication) at least one of a network access subscription and a service of the access terminal.

Unlike the conventional methods, the proposed inventions provides a provision in radio resource control (RRC), S1 and NG1-C signaling messages to carry authentication protocol messages like EAP messages, TLS, AKA, PANA (New Messages and Procedure). In order to have acceptable level of security and effective key handling, the authenticator to be in the core network is not as like in the typical EAP framework a first node in the radio access network (RAN). Further, in the proposed application, a NR relay the authentication messages to the authenticator in the NextGen core. Furthermore, in the proposed invention, there is a provision in N2 interface between the SEAF/AMF and the gNB or the non-3GPP Interworking Function (N3IWF) and N11 interface between the SEAF/AMF and the SMF messages to carry the key between different network entities.

Unlike performing authentication as part of mobility management and session management signalling procedures in the existing systems and the existing methods, the proposed method performs the separate authentication to support a unified authentication framework. The proposed method can be used to avoid sending privacy information before security context establishment. By performing the authentication procedure, the AT and the SEAF/AMF establish the security context and start securing (Integrity Protection and/or Encryption/Ciphering) of the NAS, AS and may also User Plane traffic. Once Authentication is performed, then the AT request for service or provides network slice information to the AMF. Alternatively, the AMF/SEAF performs the authentication, then request the sensitive information or parameters (like, Network Slice Selection Assistance information (NSSAI)) from the AT in a separate NAS message and in response the AT provides the sensitive information or parameters with protection (Integrity Protection and/or Encryption/Ciphering).

The proposed method allows only emergency call messages, authentication protocol and related signaling messages between the UE and the core network until receiving the authentication successful message from the core network.

Referring now to the drawings, and more particularly to 1 to 15 and 18 to 25, there are shown preferred embodiments.

FIG. 1 is a schematic diagram illustrating an overview of a system 1000a for authenticating access in a mobile wireless network system, according to the embodiments as disclosed herein.

Referring to the FIG. 1, in an embodiment, the system 1000a includes an access terminal (AT) 100, an access network 200, and a core network 300. In an embodiment, the core network 300 includes an EAP authenticator 302 and an AAA/EAP server 304. The AT 100 can be, for example but not limited to, a cellular phone, a tablet, a smart phone, a laptop, a Personal Digital Assistant (PDA), a global positioning system, a multimedia device, a video device, a game console, or the like.

The AT 100 may also be referred to by those skilled in the art as a User Equipment (UE), a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The AT 100 is compliant with multiple, different communication protocols that can operate as a multi-mode device by communicating within a 5G network.

The access terminal 100 is in a first radio access network. The EAP authenticator 302 communicates with the access terminal 100 through the Access network 200. The EAP authenticator 302 is located at a secure location in a second core network. The EAP authenticator 302 is configured to receive the encapsulated EAP packet from the access terminal 100 over the high rate packet data radio link.

In an embodiment, the EAP packet is encapsulated over the NAS protocol. In an embodiment, the EAP packet is encapsulated over the RRC protocol. In an embodiment, the EAP packet is encapsulated over a N12 interface.

In an embodiment, the EAP packet is encapsulated over a S1-C. In an embodiment, the EAP packet is encapsulated over a IKEv2. In an embodiment, the EAP packet is encapsulated over a PANA.

Further, the EAP authenticator 302 is configured to authenticate at least one of network access subscription and a service of the access terminal 100.

After authenticating at least one of the access terminal 100 and the service of the access terminal 100, the EAP authenticator 302 is configured to generate a security content including at least one security key. After generating the security content including at least one security key, the EAP authenticator 302 is configured to provide at least one generated security content to at least one entity in the radio access network to enable secure communication with between the at least one entity in the radio access network and the access terminal 100.

In an embodiment, the EAP packet is encapsulated using an EAP encapsulation protocol, wherein the EAP encapsulation protocol includes at least one of N1 signaling protocol, NAS protocol, and signaling protocol between the AT 100 and a SEAF (not shown).

In an embodiment, the secure node is at least one of a SEAF, an AMF and the AUSF.

In an embodiment, an entity in the radio access network 200 relays the EAP packet from the access terminal 100 to the EAP authenticator 302.

In an embodiment, the second core network is different than the first radio access network.

In an embodiment, the second radio access network is a next generation core network of the first radio access network.

In an embodiment, the EAP authenticator 302 is configured to authenticate the access terminal 100 through the AMF entity, wherein the AMF entity interfaces with an AAA/EAP server 304 (i.e., AUSF entity) to carry out the authentication.

In an embodiment, the EAP authenticator functionality is distributed among different entities in the 5G network system, where the security termination is performed by the radio access network entity and also the AMF/SEAF entity (not shown).

In an embodiment, the EAP authenticator functionality is distributed among different entities in the 5G network system, where the security termination is performed by the AMF, and the AMF and the SEAF are separate entities.

In an embodiment, the EAP authenticator functionality is distributed among different entities in the 5G network system where the authentication is initiated by the SEAF/AMF.

In an embodiment, the EAP authenticator functionality is distributed among different entities in the 5G network system, where the authentication is initiated by the SEAF, and the AMF and the SEAF are separate entities.

In an embodiment, the EAP authenticator functionality is distributed among different entities in the 5G network system by routing of the EAP packets to appropriate EAP server by the AMF/SEAF.

In an embodiment, the EAP authenticator functionality is distributed among different entities in the 5G network system by routing of the EAP packets to appropriate EAP server by the SEAF, when the AMF and the SEAF are separate entities.

In an embodiment, the EAP authenticator functionality is distributed among different entities in the 5G network system, where the SEAF receives the master or anchor key, derives further keys and distributes the keys to other network entities.

In an embodiment, the EAP authenticator functionality is distributed among different entities in the 5G network system where the AMF entity performs the bridging of the access technology specific EAP encapsulation protocol and the Diameter/Radius protocol.

In an embodiment, the EAP authenticator functionality is distributed among different entities in the 5G network system where access control of the AT 100 is performed by the Radio access network entity (gNB).

In an embodiment, the registration procedure is used to trigger the authentication procedure by the AT 100 with the network, when the AT 100 does not have a valid security context or when the AT 100 needs to perform only the authentication procedure. The registration procedure include the registration type as one of the following: initial registration and authentication procedure.

In an embodiment, the keys are fetched from the SEAF by the network entities when the AT 100 requests for the network access.

The FIG. 1 shows the limited overview of the system 1000a but, it is to be understood that other embodiments are not limited thereto. Further, the system 1000a includes any number of hardware or software components communicating with each other. By way of illustration, both an application running on a device and the device itself can be a component.

FIG. 2 is a schematic diagram illustrating an overview of a system 1000b for authenticating access in the mobile wireless network system, where the system includes a 3GPP access network, the core network 300, and a non-3GPP access network, according to the embodiments as disclosed herein.

Referring to the FIG. 2, in an embodiment, the system 1000b includes a set of access terminals (ATs) 100a and 100b, an access network 200, an access point 400, the EAP authenticator 302, the AAA/EAP server 304, and a CP-SM (SMF)/MM (AMF) 306. The AT 100a communicates with the access network 200 and the AT 100b communicates with the access point 400 in a non-3GPP access network (i.e., WLAN).

In an embodiment, an EAP based authentication framework for NextGensystem is proposed as to have a unified authentication framework for different access systems, to access an Evolved Packet Core (EPC) and/or a Next Generation (NextGen) Core. The AAA/EAP server 304 (AUSF) in the NextGencore is used by different radio access technologies (RATs) and also by different stake holders like UE vendors, factory servers for provisioning, application level authentication and maintenance. An authenticator functionality defined in a RFC 3748, to be located in the core network as to support key handling during mobility (e.g., Intra/Inter-Public Land Mobile Network Hand-Over (PLMN HO)) and also to support different key termination points in a more secured way. The NextGen RAT (N-RAN) or new radio (NR) access technology or the LTE access technology (eNB) and the authenticator 302 relays the EAP messages from the AT 100 to the authentication server 304.

The FIG. 2 depicts the authentication framework for the NextGensystem. The mutual authentication is performed between the UE 100 and the AAA/EAP server 304. The AAA server 304 may interface with a Home Subscriber Server (HSS) 304 to retrieve the authentication credentials and subscription details. Unlike the existing mechanisms, the authentication mechanisms is separated from mobility management and session management signaling. After the successful mutual authentication, the CP-AU node 306 provides the security context (security keys) to the NR entity(s) and other core network entities for communication protection (interface protection).

The FIG. 2 shows the limited overview of the system 1000b but, it is to be understood that other embodiments are not limited thereto. Further, the system 1000b includes any number of hardware or software components communicating with each other. By way of illustration, both an application running on a device and the device itself can be a component.

FIG. 3 is a schematic diagram illustrating an overview of a system 1000c for authenticating access in the mobile wireless network system, where the system includes the 3GPP access network, the core network 300, and a third party domain, according to the embodiments as disclosed herein.

Referring to the FIG. 3, in an embodiment, the system 1000c includes the access terminal 100, the access network 200, the EAP authenticator 302, a set of AAA/EAP server 304a and 304b, and a CP-SM (SMF)/MM (AMF) 306. The AAA server 304a is located in the core network. The AAA server 304b is located in a 3rd party domain. The operations and functionalities of the access terminal 100, the access network 200, the EAP authenticator 302, the AAA servers 304a and 304b, and the CP-SM/MM 306 are explained in conjunction with the FIGS. 1 and 2.

EAP messages via the AAA server 304a in the EPC/NextGen Core: In an embodiment, the AAA server 304a in the Next Gen core and/or in the EPC, acts as AAA proxy and forwards the EAP payloads to an appropriate 3rd party AAA server 304b. The authenticator for this scenario can be an application server or CP-AU (as shown in FIG. 3) and it is in Next Gen system (before the AAA proxy). The AAA server 304a identifies the appropriate 3rd party server based on the UE identity (e.g., IMSI/IMEI) and/or the application/service information provided by the UE (for example, Domain name, Service request, service request ID).

EAP messages via the Authenticator: In an embodiment, the Authenticator 302 identifies the 3rd Party authentication (Secondary Authentication) using the 3rd party AAA/EAP server 304b by using the identity provided by the NextGen UE (N-UE) to the network and initiates the EAP authentication accordingly. The CP-AU/MME/SMF acts as the authenticator for this scenario.

EAP relay by the NR: In an embodiment, the NR directly connects to the 3rd party AAA server 304b. The NR acts as the authenticator for this scenario. Resolving 3rd Party AAA server 304b based on ID provided by the UE and/or the application/service information provided by the UE (for example, Domain name, Service request, service request ID).

The FIG. 3 shows the limited overview of the system 1000c but, it is to be understood that other embodiments are not limited thereto. Further, the system 1000c includes any number of hardware or software components communicating with each other. By way of illustration, both an application running on a device and the device itself can be a component.

FIGS. 4 and 5 are illustrating schematic diagrams of a system for authenticating access in the mobile wireless network system, where the system includes a NextGen home network and a NextGen visited network, according to the embodiments as disclosed herein.

Referring to the FIG. 4, the system 1000d includes the set of access terminals 100a and 100b, the access networks 200a and 200b, a set of Security Anchor Function (SEAF) units 308a and 308b (a common label of the SEAF is 308), a set of Authentication Server Functions (AUSF) units 310a and 310b (a common label of the AUSF is 310), a set of Authentication Credential Repository and Processing Functions (ARPF) units 312a and 312b (a common label of the ARPF is 312), a set of User Plane Functions (UPF) units 314a and 314b (a common label of the UPF is 314), a set of Session Management Function (SMF) units 316a and 316b (a common label of the SMF is 316), and a set of MMF units 318a and 318b (a common label of the MMF is 318). In an embodiment, the SEAF and the MMF are co-located.

In an embodiment, the mutual authentication is performed between the NextGen UE and the AUSF 310 (i.e., EAP server) via the SEAF 308 (i.e., authenticator). The SEAF 308 interfaces with the AUSF 310 for carrying out the authentication. The SEAF 308 is configured with the relevant information for routing of the authentication request to the appropriate AUSF. The AUSF 310 interfaces with the ARPF 312 to retrieve the authentication information and subscription details. The authentication signalling passes through AUSF proxies in a visited network. The NextGen UE interfaces with the SEAF 308 via the NR, for authentication procedures.

Unlike the existing mechanisms in 3GPP system, the NextGen System authentication procedure is separated from mobility management and session management procedures. Performing authentication procedure independently allows decoupling and independent evolution of CN/AN and also supports decoupling of authentication server functionality from the MM and SM functionality in the network, so that if required the MM and SM functionality can be moved towards the NR.

After the successful mutual authentication, the SEAF 308 obtains a keying material from the AUSF 310 and provides the security context to the NR entity(s) and other core network entities for communication protection. The NextGen UE performs the mobility management and session management procedures, after successful authentication and security association establishment procedure.

In an embodiment, the RRC and NG2 signalling protocol encapsulates the EAP payloads between the UE 100 and the SEAF 308. The NR access network performs relay functionality for the EAP payloads. The NR takes care of filtering of packets from the non-authenticated NextGen UEs. The NR allows only the EAP messages to pass through until the NR receives the security context from the core network 300.

In the following, four authentication-related functions in the core network 300 are defined:

The ARPF unit 312: The ARPF unit 312 stores the long-term security credentials used in authentication and executes any cryptographic algorithms that use the long-term security credentials as input. The ARPF unit 312 also stores the (security-related part of the) subscriber profile. The ARPF unit 312 shall reside in a secure environment in an operator's home network or a 3rd party system, which is not exposed to unauthorized physical access. The ARPF unit 312 interacts with the AUSF unit 310.

In an embodiment, the long term-security credentials include shared permanent secrets such as the key K in EPS AKA or EAP-AKA.

The AUSF unit 310: The authentication function that interacts with the ARPF unit 312 and terminates requests from the SEAF unit 308. The ARPF 312 is part of a Unified Data Management (UDM) or a Unified Data Management (UDM).

In an embodiment, the AUSF unit 310 may also assume the role of an AAA proxy that forwards authentication messages.

SEAF unit 308: In an embodiment, the authentication function in the core network that interacts with the AUSF unit 310 and the NG-UE and receives from the AUSF unit 310 the intermediate/anchor key that is established as a result of the NG-UE authentication process. The SEAF unit 308 also interacts with the Mobility Management (MM) function, e.g. during initial Attach, and with the SCMF.

SCMF unit: The SCMF unit receives the key from the SEAF 308 that it uses to derive further (e.g., access-network specific) keys. The SCMF unit shall reside in the secure environment in the operator's network, which is not exposed to unauthorized physical access. In the roaming case, the SCMF unit resides in the visited network.

SPCF unit: The SPCF unit provides the security policy based on the service application applicable to security policy negotiation e.g. UP protection negotiation. The security policy negotiation may be based on the following information: security capabilities of UE 100, security capabilities of network/network slice and security policy based on the service application. The SPCF unit may distribute the security policy based on the service application to the network entities (e.g. SMF, AMF) and/or to the UE 100. The SPCF unit shall reside in the secure environment in the operator's network, which is not exposed to unauthorized physical access. The SPCF could be standalone or co-located with the PCF, if the SPCF is co-located with the PCF, the security policy based on service application can be retrieved via a NG5 interface between the PCF and the AF.

The FIG. 4 shows the limited overview of the system 1000d but, it is to be understood that other embodiments are not limited thereto. Further, the system 1000d includes any number of hardware or software components communicating with each other. By way of illustration, both an application running on a device and the device itself can be a component.

Referring to the FIG. 5, the system 1000e includes the set of access terminals 100a and 100b, the access networks 200a and 200b, the set of SEAF units 308a and 308b, a set of AUSF units 310a and 310b, the set of ARPF units 312a and 312b, the set of UPF units 314a and 314b, the set of SMF units 316a and 316b, and the set of MMF units 318a and 318b. The operation and functions of the set of access terminals 100a and 100b, the access networks 200a and 200b, the set of SEAF units 308a and 308b, the set of AUSF units 310a and 310b, the set of ARPF units 312a and 312b, the set of UPF units 314a and 314b, the set of SMF units 316a and 316b, and the set of MMF units 318a and 318b are explained in conjunction with the FIG. 4.

In an embodiment, the mutual authentication is performed between the NextGen UE and the AUSF unit 310 via the MMF unit 318 and the SEAF unit 308. The SEAF unit 308 interfaces with the AUSF unit 310 for carrying out the authentication. The SEAF unit 308 is configured with the relevant information for routing of the authentication request to the appropriate AUSF. The AUSF unit 310 interfaces with the ARPF 312 to retrieve the authentication information and subscription details.

Unlike the existing mechanisms in 3GPP system, the NextGensystem authentication procedure is performed along with the mobility management procedures during the initial attach procedure. After the successful mutual authentication, the SEAF unit 308 obtains the keying material from the AUSF 310 and provides the security context to the NR entity(s) and other core network entities for communication protection. If the UP security is terminated between the UE and the UPF 314, then the key KUP for protecting the UP is provided to the UPF 314 by the MMF 318 via the SMF 316.

In an embodiment, the NAS signalling protocol (over the NG1) encapsulates the EAP payloads between the UE and the SEAF. The NR access network performs relay functionality for the EAP payloads. The NR takes care of filtering of packets from the non-authenticated NextGen UEs. The NR allows only the EAP messages to pass through until the NR receives the security context from the core network 300.

The FIG. 5 shows the limited overview of the system 1000e but, it is to be understood that other embodiments are not limited thereto. Further, the system 1000e includes any number of hardware or software components communicating with each other. By way of illustration, both an application running on a device and the device itself can be a component.

FIG. 6a illustrates the EAP based authentication framework based on the EAP over the RRC and the EAP over the NG1-C/S1-C, according to the embodiments as disclosed herein. The CP-AU node 306 and/or the MME perform the authenticator functionality. As depicted in FIG. 6a, there is need for two EAP lower layer encapsulation protocol and bridging functionality in N-RAN (NR). The RRC and NG1-C signaling protocol encapsulates the EAP payloads between the UE 100 and the CP-AU node 306. The NR access network performs bridge/relay functionality for the EAP payloads. In an embodiment, the EAP over a Packet Data Convergence Protocol (PDCP) is also done (provided PDCP header carries the information to indicate EAP as payload, if carried as the user plane payload) or authentication parameters are carried over the PDCP at same layer as RRC. In this case, the same layer as like RRC can be termed as authentication container.

In another embodiment, the authentication container can be carried over the interface between the UE 100 and the NR and the interface between the NR and the core network (may be NG1-C or S1-C or S1-MME). One possibility is to use the network interface protocol (between the CP-AU node 306 and other network entities (CP-xx, xx can be mobility management and/or session management entity)) or Diameter protocol for key distribution between the network entities (CP-AU to CP-xx). The NR will not perform access control (till security context is enabled), which means the NR allows only the emergency call messages, authentication protocol (containers) and related signaling messages between the UE 100 and the core network 300 until the CP-AP node 306 receives the authentication successful message from the core network 300. As depicted in FIG. 6a, a Stream Control Transmission Protocol (STCP) protocol is used at a transport layer, it should be noted that any transport layer protocol along with tunneling protocols (for example GTP-C) can be used.

FIG. 6b illustrates the EAP based authentication framework based on the EAP over the NAS, according to the embodiments as disclosed herein. As depicted in FIG. 6b, the NAS protocol encapsulates the EAP payloads. The MSK to be used as like the KASME to generate further keys. In another embodiment, the CP-AU node (e.g., SEAF/AMF 306) and/or the MME perform the authenticator functionality. The CP-AU node supports the NAS protocol (even if the CP-AU node is a standalone physical entity). This results in reducing the number of the EAP encapsulation protocol.

The main functionality of the EAP authenticator 302 are, (1) Initiation of the authentication and access control (blocking of unauthenticated UE access), (2) Routing of the EAP packets to appropriate EAP server, (3) Bridging of the access technology specific EAP encapsulation protocol and the Diameter/Radius protocol, (4) Receiving the Master/anchor Key from the EAP server for communication protection and (5) providing security termination point in the network for the UE 100.

As the authenticator is responsible to receive the Anchor Key and to protection of Radio Access Network (air interface), for efficiency, authenticator is always placed at the edge for security termination in the prior art. Going with the description in RFC 3748, the obvious entity in the 5G system for EAP authenticator 302 is gNB. However, having authenticator functionality in the gNB will reduce the level of security in 3GPP systems, as gNB is not in the operator's secured domain and does not satisfy the following 5G security architecture decisions: (1) Master key should not be exposed to the insecure location, (2) Multiple security termination point based on different interfaces between the UE 100 and the network entities (UP protection between the UE 100 and the gNB/UPF, Access Stratum protection between the UE 100 and the gNB and also Non-access stratum signaling protection between the UE 100 and the AMF). (3) Security key derivation should happen at the higher level in the network hierarchy for efficiency and to have acceptable level of security, as there are many security termination points and (4) Master key will be used for all communication protection, so NAS should handle the key distribution (as NAS cannot obtain the key from gNB (in the insecure location) for NAS protection).

Further, based on the architecture decision listed above, to increase the security level, authenticator cannot be placed at the edge of the network in an insecure location (gNB) as in the prior art. Therefore, to adopt EAP framework for 5G system, the functionality of the authenticator are split between the different 5G network entities. The authenticator functionality (access control) is with gNB, as gNB is the first node for network access. The functionality of the initiation of the authentication is performed by the SEAF/AMF, as SEAF/AMF manage the security context. Identification of the AUSF (EAP Server) is performed by the SEAF (authenticator functionality Routing of the EAP packets), as other entities (specifically gNB) are not allowed to resolve the AUSF. Since NAS terminates at the SEAF/AMF, bridging is performed by the SEAF/AMF. The prime functionality of receiving the key from AUSF is performed by the SEAF. SEAF derives further keys and distribute it to the multiple security termination points. There are multiple security termination point in 5G (NR, MMF).

FIG. 6c illustrates the EAP based authentication framework based on the EAP over the PANA/IKEv2, according to the embodiments as disclosed herein. The PANA or IKEv2 protocol is used to carry the EAP from the UE 100 to the CP-AU/MME. For the EAP over the PANA/IKEv2, the authentication is performed after IP address assignment.

FIG. 7a illustrates the EAP over PC5-C, RRC and EAP over NG1-C/S1-C for a NR Relay (NRR) scenario, according to the embodiments as disclosed herein. In FIG. 7a, the NR Relay (NRR) scenario, PC5 signaling Protocol encapsulates the EAP payloads in the PC5 interface and then the RRC Protocol in the relay node encapsulates the EAP messages in the Uu interface. Relay node (RN) and NR performs bridge functionality.

FIG. 7b illustrates the EAP over the NAS for the NRR scenario, according to the embodiments as disclosed herein. In FIG. 7b, the NAS encapsulates the EAP payloads and the relay node performs RRC switching of the NAS/CN signaling messages. This alternative requires the support of NAS protocol in the CP-AU node 306 (i.e., security functional entity).

FIG. 7c illustrates the EAP over PANA/IKEv2 for the NRR scenario, according to the embodiments as disclosed herein. In FIG. 7c, IP based routing is performed by the relay node to relay the EAP messages.

FIG. 8a illustrates a sequential flow diagram illustrating the authentication procedure during initial attach procedure, according to the embodiments as disclosed herein. The NextGen UE (i.e., AT 100) performs (802a) the RRC connection establishment procedure with the NR 800. After the RRC connection establishment, the NextGen UE initiates (804a) the attach procedure with the MMF 318 by sending the attach/service request message. The NextGen UE includes the identity along with the attach/service request message.

On receiving the attach request message from the NextGen UE, the MMF 318 sends (806a) the key request message to the SEAF 308, if there is no security context available with the MMF 318.

In an embodiment, if the SEAF does not have the context, then the following procedure till message 824a is performed. The SEAF 308 sends (808a) an Auth1_Req message to the AUSF 310. Based on the Auth1_Req message, the AUSF 310 sends (810a) an ARPF_Req message to the ARPF 312. Based on the ARPF_Req message, the ARPF 312 sends (812a) an ARPF_Resp message to the AUSF 310. Based on the ARPF_Resp message, the AUSF 310 sends (814a) an Auth1_Resp message to the SEAF 308. Based on the Auth1_Resp message, the SEAF 308 sends (816a) an AuthUE1_Req message to the AT 100. The AT 100 sends (818a) the AuthUE1_Resp message to the SEAF 308. The SEAF 308 sends (820a) an Auth2_Req message to the AUSF 310. The AUSF 310 sends (822a) an Auth2_Resp message including a success information to the SEAF 308. Based on the Auth2_Resp message, the SEAF 308 sends (824a) an AuthUE_Sucess message to the AT 100.

In an embodiment, the SEAF 308 initiates the EAP authentication procedure by requesting the authentication credentials from the ARPF 312. The EAP authentication is performed between the UE 100 and the AUSF 310. The number of EAP message exchanges between the UE 100 and the AUSF 310, and the AUSF 310 and the ARPF 312, depends upon the EAP method. At the end of the successful authentication procedure, the SEAF 308 obtains intermediate key (MSK) from the AUSF 310.

In an embodiment, if the NextGen UE 100 is already authenticated with the SEAF 308 and if the intermediate key is valid, then the SEAF 308 provides the keys (as shown in the step 826a), without performing the authentication steps (i.e., steps 808-824).

In an embodiment, the SEAF 308 derives (826a) further keys (KNAS, KNR, KUP) and provide these derived keys to the MMF 318 in the key response message. A SCMF is always co-located with the SEAF 308. In an embodiment, the SEAF 308 provides the access anchor key to the MMF 318 and MMF 318 derives further keys (KNAS, KNR, KUP) from the access anchor key. The communication between the AMF and the SEAF may include one or more AMFs.

Further, the MMF 318 provides (828a) the key (KNR) to the NR 800. The NR 800 further derives (830a) the request key to protect the AS messages and also UP packets, based on configuration. In an embodiment, if the AT 100 is requesting service from the non-3GPP network, then the MMF 318 provides the access specific key to the non-3GPP network entity.

If the UP security terminates (832a) at the UPF 314, then the MMF 318 provides (834a) the key (KUP) to the UPF 314 via the SMF 316 during session establishment procedure.

FIG. 8b illustrates a sequential flow diagram illustrating step by step procedure involved for performing the separate authentication to support the unified authentication framework. The proposed method can be used to avoid sending privacy/sensitive information before security context establishment. By performing the authentication procedure separately, the AT 100 and the SEAF 308/AMF establish the security context and start securing (Integrity Protection and/or Encryption/Ciphering) of the consecutive NAS message, AS message and may also User Plane traffic, as detailed in steps 802b to 818b.

In an embodiment, at 802b the AT 100 (does not contain valid security context and/or performs initial attach procedure and/or state transit from a RM-DEREGISTERED) in the registration request message includes the registration type as authentication, UE identity and UE capabilities. The AT 100 does not include any sensitive or unprotected information. Once authentication is performed, then the AT 100 requests for service or provides network slice information to the AMF in the protect message. As shown in the FIG. 8b, after step 818b, the messages from the AT 100 are protected using the established security context. The message is protected and contains sensitive information like Network slice identities (NSSAI) by using the either step 820b or step 822b.

In an embodiment, the AMF/SEAF 308 performs the authentication, then request the sensitive information or parameters (like, Network Slice Selection Assistance information (NSSAI)) from the AT 100 in the separate NAS message and in response the AT 300 provides the sensitive information or parameters with protection (Integrity Protection and/or Encryption/Ciphering).

In an embodiment, the AT 100 sends (802b) the registration request along with registration request type as authentication, a permanent identity, and a UE capability to the RAN. The RAN itself initiates (804b) the SEAF 308/AMF selection. Further, the RAN sends (806b) the registration request along with the registration request type as authentication, the permanent identity, and the UE capability) to SEAF 308/AMF. The SEAF 308/AMF itself initiates (808b) the AUSF selection. The SEAF 308/AMF sends (810a) the authentication initiation request to the AUSF 310. The UDM sends (812b) an authentication vector request/response to the AUSF 310. The mutual authentication is performed (814b) between the AT 100 and the AUSF 310. The security context establishment is performed (816b) between the AT 100 and the SEAF 308/AMF. The security context establishment is performed (818b) between the AT 100 and the RAN. With the 818b, the registration procedure for the registration request type Authentication is completed. In an embodiment, the registration procedure with registration request type as authentication, includes Update Location procedure with the UDM, by the AMF after successful authentication. The AT 100 then may sends (822a) the registration request along with the initial registration, the TEMP ID, and the network slice information) to the SEAF 308/AMF. The AT 100 sends (824b) the service request along with the initial registration and the TEMP ID to the SEAF 308/AMF.

FIG. 9 illustrates a sequential flow diagram illustrating step by step procedure involved for performing the EAP-TLS by the non-human IoT deployment, according to the embodiments as disclosed herein.

Referring to the FIG. 9, the NextGen UE 100 performs (902) the RRC connection establishment procedure with the NR 800. The NextGen UE 100 can be an Internet of Things (IoT) device. After the RRC connection establishment, the NextGen UE 100 initiates (904) the attach procedure with the MMF 318 by sending the attach request message. The NextGen UE 100 provides the identity along with the attach request message.

On receiving the attach request message from the NextGen UE 100, the MMF 318 sends (906) the key request message to the SEAF 308 as there is no security context available with the MMF 318.

In an embodiment, the SEAF 308 sends (908) an Auth1_Req message to the AUSF 310. Based on the Auth1_Req message, the AUSF 310 sends (910) an EAP-Request packet with EAP-Type=EAP-TLS, the Start (S) bit set, and no data to the UE 100 through the SEAF 308. The EAP-TLS conversation will then begin, with the peer sending an EAP-Response packet with EAP-Type=EAP-TLS. The data field of that packet will encapsulate one or more TLS records in TLS record layer format, containing a TLS client_hello handshake message as shown in the step 912.

Further, the AUSF 310 sends (914) the EPA message including (TLS server_hello, TLS server certificate, TLS server key exchange, TLS client certificate request, TLS server_hello_done) to the UE 100. The UE 100 sends (916) the EAP response message including a TLS client certificate, TLS client_key_exchange, TLS certificate_verify, TLS change_cipher_Spec, TLS finished to the AUSF 310. After EAP response, the AUSF 310 itself performs (918) client certificate validation using a root certificate of CA. Further, the AUSF 310 sends (920) the EAP message including TLS change_cipher_spec and TLS finished to the UE 100 through the SEAF 308. The UE 100 sends (922) the EAP Response to the AUSF 310 through the SEAF 308. Further, the AUSF 310 sends (924) the EAP success message to the UE 100 through the SEAF 308. Further, the SEAF 308 sends (926) a key response message to the MMF 318. Based on the key response message, the MMF 318 sends (928) the attach accept message to the UE 100.

In an embodiment, the authentication is performed using the subscription certificate in the UE 100 and the server certificate issued by Certificate Authority (may be owned by the operator or trusted by the operator). The private key corresponding to the subscription certificate is securely stored in the UE 100 (may be using the solution agreed for Security area #5: Security within NG-UE). Further, the AUSF 310 can validate the subscription certificate using the Root Certificate of the CA. The need for ARPF 312 for the EAP-TLS to validate the subscription certificate is implementation specific.

FIG. 10 illustrates a sequential flow diagram illustrating an authentication procedure during initial attach procedure using a NG1 interface, according to the embodiments as disclosed herein.

Referring to the FIG. 10, the NextGen UE 100 performs the RRC connection establishment procedure with the NR 800. After the RRC connection establishment, the NextGen UE 100 initiates (1002) the attach procedure with the MMF 318 by sending the attach request message. The NextGen UE 100 provides the identity along with the attach request message.

On receiving the attach request message from the NextGen UE 100, the MMF 318 sends (1004) the key request message to the SEAF 308 as there is no security context available with the MMF 318.

In an embodiment, the SEAF 308 sends (1006) the Auth1_Req message along with identity to the AUSF 310. Based on the Auth1_Req message, the AUSF 310 sends (1008) the ARPF_Req message to the ARPF 312. Based on the ARPF_Req message, the ARPF 312 sends (1010) the ARPF_Resp message to the AUSF 310. Based on the ARPF_Resp message, the AUSF 310 sends (1012) the Auth1_Resp message to the SEAF 308. Based on the Auth1_Resp message, the SEAF 308 sends (1014) the AuthUE1_Req message to the UE 100. The UE 100 sends (1016) the AuthUE1_Resp message to the SEAF 308. The SEAF 308 sends (1018) the Auth2_Req message to the AUSF 310. The AUSF 310 sends (1020) the Auth2_Resp message including the success information to the SEAF 308. Based on the Auth2_Resp message, the SEAF 308 sends (1022) the AuthUE_Sucess message to the UE 100.

In an embodiment, the SEAF 308 initiates the EAP authentication procedure by requesting the authentication credentials from the ARPF 312. The EAP Authentication is performed between the UE 100 and the AUSF 310. The number of EAP message exchanges between the UE 100 and the AUSF 310, and the AUSF 310 and the ARPF 312, depends upon the EAP method. At the end of the successful authentication procedure, the SEAF obtains intermediate key (MSK) from the AUSF 310.

In an embodiment, if the NextGen UE 100 is already authenticated with the SEAF 308 and if the intermediate key is valid, then the SEAF 308 provides the keys without performing the authentication (steps 1006-1024).

The SEAF derives (1026) further keys (KNAS and KUP) and provide these derived keys to the MMF 318 in the key response message. The SCMF is always co-located with the SEAF.

The MMF 318 provides (1028) the key [KNR] to the NR 800. The NR 800 further derives (1030) the request key to protect the AS messages and also UP packets, based on configuration.

If the UP security terminates at the UPF 314, then the MMF 318 provides (1032) the key [KUP] to the UPF 314 via the SMF during session establishment procedure.

FIG. 11 illustrates a sequential flow diagram illustrating step by step procedure involved for performing the EAP-TLS by the non-human IoT deployment using the NG1 interface, according to the embodiments as disclosed herein.

Referring to the FIG. 11, the NextGen UE 100 performs (1102) the RRC connection establishment procedure with the NR 800. After the RRC connection establishment, the NextGen UE 100 initiates (1104) the attach procedure with the MMF 318 by sending the attach request message. The NextGen UE 100 provides the identity along with the attach request message.

On receiving the attach request message from the NextGen UE 100, the MMF 318 sends (1106) the key request message including an identity to the SEAF 308 as there is no security context available with the MMF 318.

In an embodiment, the SEAF 308 sends (1108) an Auth1_Req message including an identity to the AUSF 310. Based on the Auth1_Req message, the AUSF 310 sends (1110) an EAP-Request packet with EAP-Type=EAP-TLS, the Start (S) bit set, and no data to the UE 100 through the SEAF 308. The EAP-TLS conversation will then begin, with the peer sending an EAP-Response packet with EAP-Type=EAP-TLS. The data field of that packet will encapsulate one or more TLS records in TLS record layer format, containing a TLS client_hello handshake message as shown in the step 1112.

Further, the AUSF 310 sends (1114) the EPA message including (TLS server_hello, TLS server certificate, TLS server key exchange, TLS client certificate request, TLS server_hello_done) to the UE 100. The UE 100 sends (1116) the EAP response message including a TLS client certificate, TLS client_key_exchange, TLS certificate_verify, TLS change_cipher_Spec, TLS finished to the AUSF 310. After EAP response, the AUSF 310 itself performs (1118) client certificate validation using the root certificate of CA. Further, the AUSF 310 sends (1120) the EAP message including TLS change_cipher_spec and TLS finished to the UE 100 through the SEAF 308. The UE 100 sends (1122) the EAP Response to the AUSF 310 through the SEAF 308. Further, the AUSF 310 sends (1124) the EAP success message to the UE 100 through the SEAF 308. Further, the SEAF 308 sends (1126) a key response message to the MMF 318. Based on the key response message, the MMF 318 sends (1128) the attach accept message to the UE 100.

In an embodiment, the authentication is performed using the subscription certificate in the UE 100 and the server certificate issued by Certificate Authority (may be owned by the operator or trusted by the operator). The private key corresponding to the subscription certificate is securely stored in the UE 100 (may be using the solution agreed for Security area #5: Security within NG-UE). Further, the AUSF 310 can validate the subscription certificate using the Root Certificate of the CA. The need for ARPF 312 for the EAP-TLS to validate the subscription certificate is implementation specific.

FIG. 12 illustrates a key mapping procedure, according to the embodiments as disclosed herein. In an embodiment, the EAP Master Session Key (MSK) is used as the root/anchor key to generate further keys as shown in FIG. 12. As master key (MK) cannot be exported out of the AAA server 304, therefore MSK is used as KASME. It is possible to use MSK for NAS and EMSK for AS. Alternatively, MSK as KASME and Extended Master Session Key (EMSK) as Next Hop (NH) parameter. In an embodiment, since the core network entity is the authenticator, the AAA server 304 provides the MK to the CP-AU 206/MME 118.

FIG. 13 illustrates a key distribution flow in the mobile wireless network system, according to the embodiments as disclosed herein. The AAA server 304 itself performs (1302) the mutual authentication. Based on the mutual authentication, the AAA server 304 provides (1304) the keying material to the CP-AU 306/MME 318. The CP-AU 306/MME 318 derives (1306) further key using the keying material and a unique parameter 1306. The AAA server 304 distributes (1308) the keys based on the CP procedure to configured entities.

After distributing the keys, the NR 800 sends (1310) the key request to the CP-AU 306/MME 318. Based on the key request, the CP-AU 306/MME 318 sends (1312) the key response along with the key to the NR 800

After distributing the keys, the CN entity (MM) 1302 sends (1314) the key request to the CP-AU 306/MME 318. Based on the key request, the CP-AU 306/MME 318 sends (1316) the key response along with the key to the CN entity 1304

After distributing the keys, the CN entity (GW) 1304 sends (1318) the key request to the CP-AU 306/MME 318. Based on the key request, the CP-AU 306/MME 318 sends (1320) the key response along with the key to the CN entity (GW) 1304

After distributing the keys, a LTE 1306 sends (1322) the key request to the CP-AU 306/MME 318. Based on the key request, the CP-AU 306/MME 318 sends (1324) the key response along with the key to the LTE 1306

In an embodiment, considering multiple security termination points within the NG-Core, two potential protocol candidates for key distribution are: NG1-C and Diameter. A new protocol template is defined to carry the keys for distribution of the keys. The key distribution mechanism by the CP-AU 306 and/or MME 318 is provided based on signaling procedure or the CP-AU node and/or MME provides the key(s) based on request by each entity. The UE and the CP-AU (and/or the MME) derives cryptographically separate keys per security termination point, using a unique parameter. The Parameter can be at least any one of: "service name (for example, MM entity)", request counter, sequence count of the signaling procedure, identity of the entity.

FIG. 14 is a block diagram of various hardware elements of an apparatus 1400 for authenticating access in the mobile wireless network system, according to the embodiments as disclosed herein. In an embodiment, the apparatus includes a communication unit 1402, the EAP authenticator 302, a processor 1404, and a memory 1406. The EAP authenticator 302 is coupled to the memory 1406 and the processor 1404.

The EAP authenticator 302 is configured to receive the EAP packet encapsulated from the access terminal 100 over the high rate packet data radio link and the signaling interface through the radio access network. After receiving the EAP packet encapsulated from the access terminal 100, the EAP authenticator 302 is configured to authenticate at least one of the access terminal 100 and the service of the access terminal.

Further, the EAP authenticator 302 is configured to generate the security content including at least one security key. After generating the security content including at least one security key, the EAP authenticator 302 is configured to provide at least one security to at least one entity in the radio access network to enable secure communication with between the at least one entity in the radio access network and the access terminal 100.

The communication unit 1402 is configured for communicating internally between internal units and with external devices via one or more networks. A memory is coupled with a storage unit (not shown). The storage unit may include one or more computer-readable storage media. The storage unit may include non-volatile storage elements. Examples of such non-volatile storage elements may include magnetic hard disc, optical discs, floppy discs, flash memories, or forms of electrically programmable memories (EPROM) or electrically erasable and programmable (EEPROM) memories. In addition, the storage unit may, in some examples, be considered a non-transitory storage medium. The term "non-transitory" may indicate that the storage medium is not embodied in a carrier wave or a propagated signal. However, the term "non-transitory" should not be interpreted that the storage unit is non-movable. In some examples, the storage unit can be configured to store larger amounts of information than a memory. In certain examples, a non-transitory storage medium may store data that can, over time, change (e.g., in Random Access Memory (RAM) or cache).

Although the FIG. 14 shows the hardware components of the apparatus 1400 but it is to be understood that other embodiments are not limited thereon. In other embodiments, the apparatus 1400 may include less or more number of components. Further, the labels or names of the components are used only for illustrative purpose and does not limit the scope of the invention. One or more components can be combined together to perform same or substantially similar function to authenticate the access in the mobile wireless network system.

FIG. 15 is a flow diagram 1500 illustrating a method for authenticating access in the mobile wireless network system, according to the embodiments as disclosed herein. The operations of 1502 to 1508 are performed by the EAP authenticator 302.

At 1502, the method includes receiving the EAP packet encapsulated from the access terminal 100 over the high rate packet data radio link and the signaling interface through the radio access network. At 1504, the method includes authenticating at least one of the network access subscription and a service of the access terminal 100. At 1506, the method includes generating the security content including at least one security key. At 1508, the method includes providing the at least one security content to at least one entity in the radio access network to enable secure communication with between the at least one entity in the radio access network and the access terminal 100.

The various actions, acts, blocks, steps, or the like in the flow diagram 1500 may be performed in the order presented, in a different order or simultaneously. Further, in some embodiments, some of the actions, acts, blocks, steps, or the like may be omitted, added, modified, skipped, or the like without departing from the scope of the invention.

FIG. 18a and FIG. 18b are sequence diagrams illustrating a step by step procedure for deciding and initiating a WT release and WT addition procedure to ensure a key change in the WLAN by the eNB 200, according to the embodiment as disclosed herein. FIG. 18a and FIG. 18b are successive drawings.

In an embodiment, using derived key further when the root key becomes void is not a good security practice. It is preferred to refresh the WLAN keys (S-KWT) immediately, once the LTE intermediate root key (KeNB) is changed. If the LTE key KeNB is compromised, then the derived WLAN key S-KWT can also be compromised until the WLAN WT performs the key update. Further, if a security threat (for example, key compromise) is identified in the LTE network by the network entities, then the threat is mitigated usually by performing key refresh/re-keying procedure in the LTE, however, the treat continues in the WLAN, if the key is not updated immediately after the LTE key change. Some scenarios mandate Key change (refresh/re-keying) immediately (for example, when KeNB re-Keying is performed in the LTE), irrespective of PDCP ciphering is on/off, for the following:

a. Use of a key for a long time,
b. Counter check procedure failures, and
c. Key sync failure (moving to idle to active) or activation of native context For some scenarios it is mandate to perform the key change (refresh/re-keying) later (for example, when KeNBrefresh is performed)

a. PDCP wrap-around, and
b. Handover (due to mobility or for to be in better coverage)

When the eNB 200 provides the key to a WT 400, the information relate to EPS (purpose of the key change) to be hidden from other RATs. However, the eNB 200 needs to indicate whether the key to be refreshed (taken in to active state) immediately or later (based on configuration, during periodic refresh procedure) in the WLAN access network. As Intra cell HO is performed for key change in connect state, it is necessary for the eNB 200 to decide and indicate whether key change in the WLAN is needed or not based on LTE key change reason.

In an embodiment, for every KeNB (LTE Key) change, the eNB 200 has the option of requesting the AT 100 and/or the WT 400 to perform the WLAN key (S-KWT) change immediately (which means, the AT 100 and WT 400 starts using the fresh S-KWT immediately for WLAN, by forcing WLAN authentication) or to perform the key (S-KWT) change later (based on WLAN configuration) by the following options:

A. The eNB 200 provides the new S-KWT to the WT 400 and the Count to the AT 100, with an indication whether to perform the WLAN key change immediately or later (in case of performing the WLAN key change later, the WT 400 cache the new key and refresh the key based on the WLAN configuration (configuration may be to take the new key when performing the next WLAN authentication)).

B. The eNB 200 provides the new S-KWT to the WT 400 and the WT count value to the AT 100, only if the key refresh to be performed immediately (independent of WT configuration).

C. The eNB 200 has the option to perform LWA bearer release and addition to perform the key refresh immediately and for 'key refresh later', either the eNB 200 provides the new S-KWT to the WT and the Count to the AT 100 for every new KeNB or whenever required the WT request for the key.

Referring to the FIG. 18a and FIG. 18b, the eNB 200 sends (1802) a WT addition request to the WT 400. Based on the WT addition request, the WT 400 sends (1804) a WT addition request acknowledge to the eNB 200. Based on the WT addition request acknowledge, the eNB 200 sends (1806) the RRCConnection reconfiguration message to the AT 100. Based on the RRCConnection reconfiguration message, the AT 100 sends (1808) the RRCConnection Reconfiguration Complete message to the eNB 200. After sending the RRCConnection Reconfiguration Complete message, the AT 100 starts (1810) using a new LWA configuration and performs a WLAN association procedure. The WT 400 sends (1812) the WT association confirmation to the eNB 200. The AT 100 sends (1814) the WLANConnectionStatusReport to the eNB 200.

Further, the eNB 200 itself performs (1816) a KeNB re-keying procedure and decides to enforce the use of S-Kwt key in the WLAN immediately (decision can be due to KeNB refresh happened because of PDCP Counter check procedure failures). Further, the eNB 200 sends (1818) a WT release request to the WT 400. Based on the WT release request, the WT 400 releases (1820) LWA resources.

Further, the eNB 200 sends (1822) the RRCConnectionReconfiguration along with a release LWA configuration to the AT 100. The AT 100 sends (1824) the RRCConnection Reconfiguration Complete message to the eNB 200. Further, the AT 100 releases (1826) the LWA configuration towards the WLAN.

Further, the eNB 200 sends (1828) a WT addition request (i.e., new S-KWT) to the WT 400. Based on the WT addition request, the WT 400 sends (1830) to the WT addition request acknowledge to the eNB 200.

Further, the eNB 200 sends (1832) the RRCConnectionReconfiguration message to the AT 400. Based on the RRCConnectionReconfiguration message, the AT 100 sends (1834) the RRCConnectionReconfiguration complete message to the eNB 200. Further, the AT 400 starts (1836) using the new LWA configuration and performs the WLAN association procedure (which includes WLAN Authentication procedure).

Further, the WT 400 sends (1838) the WT Association Confirmation message to the eNB 200, and the AT 100 sends the WLANConnectionStatusReport to the eNB 200.

Further, the eNB 200 performs (1842) the KeNB refresh procedure and decides not to enforce the use of new S-Kwt key in WLAN immediately (due to KeNB refresh happened because of PDCP Counter wrap around). Further, the eNB 200 sends (1844) the WTmodification request (i.e., new S-KWT) to the WT 400. Based on the WTmodification request, the WT 400 sends (1846) the WTmodification request acknowledge message to the eNB 200.

Further, the eNB 200 sends (1848) the RRCConnectionReconfiguration message along with the WT Count Value to the AT 400. The AT 400 sends (1850) to the RRCConnecReconfiguration Complete message to the eNB 200.

Further, the WT 400 initiates (1852) the Key refresh procedure based on the WLAN configuration to refresh 802.11 security, for example, when performing next WLAN authentication procedure. Further, the WT 400 optionally starts (1854) a timer based on configuration/waiting for particular trigger/event.

In an embodiment, the eNB 200 decides, initiates the WT release and WT addition procedure to ensure the Key change in the WLAN. In an embodiment, for the case where the S-KWT key to be refreshed (taken in to the active state) immediately, the eNB 200 release the LWA data radio bearer (DRB) connection between the AT 200 and the WT 400 and then add the DRB using the new key. Steps 1818 to 1820 in the FIG. 18, ensure the key change in the WLAN. For the case where the key to be refreshed (taken in to the active state) later point of time (for example, LTE KeNB change due to Handover (HO), PDCP wrap-around, like so), the eNB provides the key (S-KWT) to the WLAN and the WLAN performs the key change later point of time based on the WLAN configurations (step 1842 to 1854). It is possible for the eNB 200, to decide and perform the step 1818 to 1840 based on the details available with it (whether the data loss is acceptable, key change before any new DRB addition, like so).

FIG. 19a and FIG. 19b are sequence diagrams illustrating a step by step procedure for initiating a 4-way Handshake (WLAN Authentication procedure) immediately by the WT 400 whenever the WT 400 receives an indication from the eNB 200 to perform the key change, according to the embodiment herein. FIG. 19a and FIG. 19b are successive drawings.

The eNB 200 sends (1902) the WT addition request to the WT 400. Based on the WT addition request, the WT 400 sends (1904) the WT addition request acknowledge to the eNB 200. Based on the WT addition request acknowledge, the eNB 200 sends (1906) the RRCConnection reconfiguration message to the AT 100. Based on the RRCConnection reconfiguration message, the AT 100 sends (1908) the RRCConnection Reconfiguration Complete message to the eNB 200. After sending the RRCConnection Reconfiguration Complete message, the AT 100 starts (1910) using the new LWA configuration and performs the WLAN association procedure. The WT 400 sends (1912) the WT association confirmation to the eNB 200. The AT 100 sends (1914) the WLANConnectionStatusReport to the eNB 200.

Further, the eNB 200 itself performs (1916) a KeNB re-keying procedure and decides to perform the S-Kwt Key use in WLAN immediately. Further, the eNB 200 sends (1918) a WTmodification request (i.e., new S-KWT along with key change indication) to the WT 400. the WT 400 sends (1920) the WT Modification Request Acknowledge message to the eNB 200.

Further, the eNB 200 sends (1922) the RRCConnectionReconfiguration along with a WT Counter value to the AT 100. The AT 100 sends (1924) the RRCConnection Reconfiguration Complete message to the eNB 200. The WT initiates (1926) the Key refresh procedure immediately to refresh 802.11 security. The WT 400 sends (1928) the 802.11 Key refresh Procedure (i.e., 4-way handshake) to the AT 100.

Further, the eNB 200 performs (1930) the KeNB refresh procedure and decides not to perform S-Kwt refresh in WLAN immediately. Further, the eNB 200 sends (1932) a WT modification request (i.e., new S-KWT) to the WT 400. Based on the WT modification request, the WT 400 sends (1934) to the WT modification request acknowledge to the eNB 200.

Further, the eNB 200 sends (1936) the RRCConnectionReconfiguration message along with the WT Count Value to the AT 400. The AT 400 sends (1938) to the RRCConnectionReconfigurationComplete message to the eNB 200.

Further, the WT 400 initiates (1940) the Key refresh procedure based on the WLAN configuration to refresh 802.11 security. Further, the WT 400 starts (1942) a timer based on configuration/waiting for particular trigger/event. Further, the WT 400 sends (1944) the 802.11 Key refresh Procedure to the AT 100.

In an embodiment, the information about when to change the key is achieved using the indicator from the eNB 200 to the WT 400 or/and to the AT 100, to indicate whether key need to be refreshed immediately or later, as shown in the FIG. 19a and FIG. 19b. It should be noted, the WT (WLAN Access Point) 400 may perform other procedures before in addition to the IEEE 802.11i 4-way handshake procedure. From the WT 400 and/or UE 100 perspective, it does not know the reason for LTE key change, but it knows whether WLAN key need to refreshed immediately or later in the WLAN. In an embodiment, the eNB 200 indicates that the WLAN Key change to happen immediately using "Key Change Indicator" (as shown in the step 1918) to the WT 400 over the XW interface. The WT (WLAN AP) 400 initiates the key change procedure with the AT 100 immediately (may be using 4-way handshake) (as shown in the step 1928). For the case where the key to be refreshed (taken in to the active state) later point of time (for example, LTE KeNB change due to Handover (HO), PDCP wrap-around, like so), the eNB 200 provides the key to the WLAN without the indicator. The WLAN performs the key change based on the WLAN configurations (as shown in the steps 1930 to 1940) at later point of time.

FIG. 20a and FIG. 20b are sequence diagrams illustrating a step by step procedure for initiating a WLAN re-association procedure immediately by the AT 100 whenever the AT 100 receives an indication from the eNB 200 to perform the key change, according to the embodiment as disclosed herein. FIG. 20a and FIG. 20b are successive drawings.

The eNB 200 sends (2002) the WT addition request to the WT 400. Based on the WT addition request, the WT 400 sends (2004) the WT addition request acknowledge to the eNB 200. Based on the WT addition request acknowledge, the eNB 200 sends (2006) the RRCConnection reconfiguration message to the AT 100. Based on the RRCConnection reconfiguration message, the AT 100 sends (2008) the RRCConnection Reconfiguration Complete message to the eNB 200. After sending the RRCConnection Reconfiguration Complete message, the AT 100 starts (2010) using the new LWA configuration and performs the WLAN association procedure. The WT 400 sends (2012) the WT association confirmation to the eNB 200. The AT 100 sends (2014) the WLANConnectionStatusReport to the eNB 200.

Further, the eNB 200 itself performs (2016) the KeNB re-keying procedure. Further, the eNB 200 sends (2018) the WT modification request (i.e., new S-KWT) to the WT 400. The WT 400 sends (2020) the WT Modification Request Acknowledge message to the eNB 200.

Further, the eNB 200 sends (2022) the RRCConnection-Reconfiguration along with the WT Counter value along with the Key Change Indication to the AT 100. The AT 100 sends (2024) the RRCConnection Reconfiguration Complete message to the eNB 200. The AT 100 initiates (2026) the Key refresh procedure immediately to refresh 802.11 security. Further, the AT 100 sends (2028) the 802.11 Key refresh procedure to the WT 400.

Further, the eNB 200 performs (2030) the KeNB refresh procedure. Further, the eNB 200 sends (2032) the WT modification request (i.e., new S-KWT) to the WT 400. Based on the WT modification request, the WT 400 sends (2034) the WT modification request acknowledge to the eNB 200.

Further, the eNB 200 sends (2036) the RRCConnection-Reconfiguration message along with the WT Count Value to the AT 400. The AT 400 sends (2038) to the RRCConnectionReconfigurationComplete message to the eNB 200.

Further, the WT 400 initiates (2040) the Key refresh procedure based on the WLAN configuration to refresh 802.11 security. Further, the WT 400 starts (2042) a timer based on configuration/waiting for particular trigger/event. Further, the WT 400 sends (2044) the 802.11 Key refresh procedure to the AT 100. Further, the WLAN performs key refresh based on configuration.

In an embodiment, the eNB 200 indicates that the Key change to happen immediately using "Key Change Indicator" (as shown in step 2022) to the AT 100 over RRC signaling message. Further, AT 100 initiates the key change procedure immediately (may be using re-association procedure) (as show in the step 2028). For the case where the key to be refreshed (taken in to the active state) later point of time (for example, LTE KeNB change due to Handover (HO), PDCP wrap-around, like so), the eNB 200 provides the key to the WLAN without the indicator. The WLAN performs the key change based on the WLAN configurations ((as show in steps 2030 to 2046) at later point of time.

FIG. 21a and FIG. 21b are sequence diagrams illustrating a step by step procedure for deciding and initiating the WLAN re-association procedure, based on LTE Key refresh/re-keying scenario, to perform key change by the AT 100, according to the embodiment as disclosed herein. FIG. 21a and FIG. 21b are successive drawings.

The eNB 200 sends (2102) the WT addition request to the WT 400. Based on the WT addition request, the WT 400 sends (2104) the WT addition request acknowledge to the eNB 200. Based on the WT addition request acknowledge, the eNB 200 sends (2106) the RRCConnection reconfiguration message to the AT 100. Based on the RRCConnection reconfiguration message, the AT 100 sends (2108) the RRCConnection Reconfiguration Complete message to the eNB 200. After sending the RRCConnection Reconfiguration Complete message, the AT 100 starts (2110) using the new LWA configuration and performs the WLAN association procedure. The WT 400 sends (2112) the WT association confirmation to the eNB 200. The AT 100 sends (2114) the WLANConnectionStatusReport to the eNB 200.

Further, the eNB 200 itself performs (2116) the KeNB re-keying procedure. Further, the eNB 200 sends (2118) the WT modification request (i.e., new S-KWT) to the WT 400. The WT 400 sends (2120) the WT Modification Request Acknowledge message to the eNB 200.

Further, the eNB 200 sends (2122) the RRCConnection-Reconfiguration along with the WT Counter value to the AT 100. The AT 100 sends (2124) the RRCConnection Reconfiguration Complete message to the eNB 200. The AT 100 initiates (2126) the Key refresh procedure immediately to refresh 802.11 security if the KeNB Re-Keying is performed. Further, the AT 100 sends (2128) the 802.11 Key refresh procedure to the WT 400.

Further, the eNB 200 performs (2130) the KeNB refresh procedure. Further, the eNB 200 sends (2132) the WT modification request (i.e., new S-KWT) to the WT 400. Based on the WT modification request, the WT 400 sends (2134) the WT modification request acknowledge message to the eNB 200.

Further, the eNB 200 sends (2136) the RRCConnection-Reconfiguration message along with the WT Count Value to the AT 400. The AT 400 sends (2138) to the RRCConnectionReconfigurationComplete message to the eNB 200.

Further, the WT 400 initiates (2140) the Key refresh procedure based on the WLAN configuration to refresh 802.11 security. Further, the WT 400 starts (2142) the timer based on configuration/waiting for particular trigger/event. Further, the WT 400 sends (2144) the 802.11 Key refresh procedure to the AT 100. Further, the WLAN performs key refresh based on configuration.

In an embodiment, the AT 100 decides whether the WLAN Key change to happen immediately or not based on the LTE KeNB refresh scenario (as shown in the step 2126). Then the AT 100 initiates the key change procedure immediately (may be using IEEE 802.11 WLAN re-association procedure) (as shown in the step 2128). For the case where the key to be refreshed (taken in to the active state) later point of time (for example, LTE KeNB change due to Handover (HO), PDCP wrap-around, like so), the WLAN performs the key change based on WLAN configurations (as shown in the steps 2130 to 2144) at later point of time.

FIG. 22a and FIG. 22b are sequence diagrams illustrating a step by step procedure for explicit indication to perform the key change immediately by providing the key, according to the embodiment as disclosed herein. FIG. 22a and FIG. 22b are successive drawings.

In an embodiment, the key S-KWT is only provided to the WT 400 when relevant i.e., when the WLAN key update is required (i.e., WT addition includes the key (S-Kwt-1, S-Kwt-2) and corresponding WT counter to the AT 100) and the WLAN key update is not provided at the LTE handover when the WLAN key update is not needed (i.e., WT Modification and RRC Reconfiguration without any key change parameters). This also makes it possible to use the presence of the S-KWT as the indicator of whether the WLAN key change should be executed or not (no need for separate indicator). The presence of the S-KWT will indicate to the WT that the key to be updated soon. To the AT 100, the presence of the WT-counter will indicate that at this handover the WLAN key change has to occur. In the flow (as shown in the FIG. 22a and FIG. 22b), the WLAN is configured to refresh the PTK every 5 hrs and the Key generated during the HO is never provided to the WT, so a fresh key S-KWT derived from the current active KeNB is not used. Further, the FIG. 22a and FIG. 22b show having only the option of providing the key to perform immediate key change leads to use of PMK for the long time (for which the root key KeNB might be invalidated very long time back). If the WT 400 and the AT 100 need to perform the key refresh say at 15th minute (due to some reason, for example periodic refresh irrespective of previous refresh or due to frequent failure of integrity), then it need to use the old key (as the eNB 200 will provide the new key after 5 mins).

FIG. 23a and FIG. 23b are sequence diagrams illustrating a step by step procedure for implicit indication to perform the key change immediately, according to the embodiment as disclosed herein. FIG. 23a and FIG. 23b are successive drawings.

In an embodiment, the flow allows the independent key refresh by the LTE and the WLAN. In this flow, an explicit indicator is used to address:

i. Independent S-KWT update (since new keys are available), and ii. The Handover key is used for key refresh (not immediately, but later (may be based on WLAN configuration))

This alternative supports the following options: To perform the key change immediately. And to perform the key change later (based on WLAN configuration/preference and eNB does not have strong preference to change the key immediately). The gain of this approach compared to only having the option of requiring an immediate key change (either through re-association or through 4-way handshake) i.e. inform WT 400, inform AT 100 to execute is, the eNB 200 has the option to ask AT 100/WT 400 to perform any one key change option. So that the key change is done whenever it is appropriate. Also based on WLAN configuration, the WT 400 and the AT 100 can use the unused/fresh Key (S-KWT) for key refresh by performing re-association/4-way handshake.

Whenever KeNB is changed in the eNB 200, the eNB 200 provides the key to the WT 400 using WT modification procedure (over Xw interface) and also the eNB 200 provides the WT counter value to the AT 100 using the RRC messages. Then based on configuration in the WT 400, the WT 400 takes the new S-KWT for key refresh. No procedure defined for WT 400 to request the Key, the eNB 200 does not know when the WT 400 requires the new key, and therefore the eNB 200 updates the S-KWT for every new KeNB.

Also at handover, the eNB 200 may or may not perform key change in the WLAN. Also the eNB 200 may change the WLAN Key independent of HO. In the FIG. 22a, FIG. 22b FIG. 23a and FIG. 23b, for illustration purpose the WLAN configuration is for every 5 hours key refresh needs to happen and if new S-KWT is available then it needs to be updated within 30 minutes.

FIG. 24 is a flow diagram 2400 illustrating a method for deciding and triggering the WLAN key update procedures by the eNB 200, according to the embodiment as disclosed herein.

In an embodiment, in order to perform the key change immediately or in order to perform the key change later (based on the LTE Key refresh or Re-keying procedure). To perform key change immediately, the eNB 200 performs the WT Release (eNB to WT message exchange+eNB to UE message exchange) and then WT Addition (eNB to WT message exchange+eNB to UE message exchange+UE scans the WLAN+WLAN association procedures). To perform the key change later, the eNB 200 provides the new Key S-KWT (derived using the active KeNB) to the WT 400 for every handover procedure and WT 400/UE 100 decides and takes the new key S-KWT for key refresh, when performing the WLAN Authentication procedure. In an embodiment, the WT 400 is configured by the mobile network operator or by the WLAN operator (via the LTE network entities or via OAM entities or via the static configuration) when to perform the S-KWT refresh in the WLAN. The configuration is at least one of the following: time allowed (for example, within 15 minutes), load in the WLAN network, based on ongoing QoS parameters.

Referring to FIG. 24, at 2402, the method includes performing the LTE Key refresh/Re-Keying procedure. At 2404, the method includes determining whether to perform WLAN key refresh immediately?. If the eNB 200 performs the WLAN key refresh procedure immediately then, at 2406, the eNB 200 performs the WT release and WT addition procedure. If the eNB 200 does not immediately perform the WLAN key refresh procedure then, at 2408, the eNB 200 provides the Key to the WT and WT count value to the AT 100 to perform the key update later.

The various actions, acts, blocks, steps, or the like in the flow diagram 2400 may be performed in the order presented, in a different order or simultaneously. Further, in some embodiments, some of the actions, acts, blocks, steps, or the like may be omitted, added, modified, skipped, or the like without departing from the scope of the invention.

FIG. 25 is a flow diagram 2500 illustrating a method for triggering the WLAN Key update procedures independently by the eNB 200 and the WT 400, according to the embodiment as disclosed herein.

In an embodiment, when the WT 400 decides to refresh the S-KWT, the WT 400 request the eNB 200 to provide the new key. The eNB 200 provides the new key to the WT 400 and then provides the new count value to the AT 100, so that the AT 100 or the WT 400 initiates the WLAN key refresh procedure (if the AT 100 needs to initiate the refresh procedure then the AT 100 initiates the re-association procedure [IEEE 802.11] and if the WT 400 needs to initiate the key refresh procedure then the WT 400 initiates the WLAN 4-way handshake procedure [IEEE 802.11 (IEEE 802.11i procedure)]).

At 2502, the method includes performing the LTE Key refresh/Re-Keying procedure. At 2504, the method includes determining whether to perform WLAN key refresh immediately. If eNB 200 does not immediately perform the WLAN key refresh procedure then at 2508 the eNB 200 does not provide any key information. To refresh the key later, the WT 400 request eNB to provide new key and update the AT 100 with new WT count value. If eNB 200 performs immediately the WLAN key refresh procedure then at 2506 the eNB 200 performs the WT release and WT addition procedure.

In an embodiment, the AT 100 is informed about a new WT-counter, instead of only having the option of requiring the AT 100 to immediately perform the re-association, the eNB 200 also has the option of requesting the AT 100 to perform an update later (based on the WLAN configurations e.g. within 30 minutes). Also, the eNB 200 has an option of requesting the AT 100 to perform the key change immediately or to perform the update later based on WLAN configuration.

The various actions, acts, blocks, steps, or the like in the flow diagram 2500 may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented through at least one software program running on at least one hardware device. The elements shown in FIGS. 1 to 15 and 18 to 25 include blocks, elements, actions, acts, steps, or the like which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for supporting LTE-WLAN aggregation (LWA) by a base station, the method comprising:
  detecting that a security key update triggering event for a WLAN termination (WT) occurs, the WT being connected with the base station and a terminal for the LWA;
  performing a WT modification procedure for updating the security key for the WT based on the detected security key update triggering event being associated with a first event; and
  performing a WT release procedure and a WT addition procedure for updating the security key for the WT based on the detected security key update triggering event being associated with a second event.

2. The method of claim 1, further comprising:
  identifying the detected security key update triggering event as the first event based on a re-keying KeNB of the base station in an access stratum (AS) security content; and
  updating the security key for the WT.

3. The method of claim 2, wherein the WT modification procedure comprises:
  transmitting, to the WT, a WT modification request message including the updated security key; and
  transmitting, to the terminal, a radio resource control (RRC) message including a value of a WT counter used in a derivation of the updated security key,
  wherein the updated security key is used by the terminal and the WT, based on a WLAN authentication being triggered.

4. The method of claim 1, further comprising:
  identifying the detected security key update triggering event as the second event based on a mismatch in a packet data convergence protocol (PDCP) count when performing a counter check procedure; and
  updating the security key for the WT.

5. The method of claim 4,
  wherein the WT release procedure comprises transmitting, to the WT, a WT release request message including the updated security key,
  wherein the WT addition procedure comprises: transmitting, to the WT, a WT addition request message including the updated security key; and transmitting, to the terminal, a radio resource control (RRC) message including a value of a WT counter used in a derivation of the updated security key.

6. A method for supporting LTE-WLAN aggregation (LWA) by a WLAN termination (WT), the method comprising:
  performing a WT modification procedure for updating a security key for the WT based on a security key update triggering event associated with a first event being detected by a base station; and
  performing a WT release procedure and a WT addition procedure for updating the security key for the WT based on the security key update triggering event associated with a second event being detected by the base station,
  wherein the WT is connected to the base station and a terminal for the LWA, and
  wherein the security key for the WT is to be used between the terminal and the WT.

7. The method of claim 6, wherein the first event is identified by the base station based on re-keying KeNB of the base station in an access stratum (AS) security content.

8. The method of claim 7,
  wherein the WT modification procedure comprises receiving, from the base station, a WT modification request message including a security key updated by the base station,
  wherein a radio resource control (RRC) message, including a value of a WT counter used in derivation of the updated security key, is transmitted from the base station to the terminal for performing the WT modification procedure, and
  wherein the updated security key is used by the terminal and the WT, based on a WLAN authentication being triggered.

9. The method of claim 6, wherein the second event is identified by the base station based on a mismatch in a packet data convergence protocol (PDCP) count when performing a counter check procedure.

10. The method of claim 9,
  wherein the WT release procedure comprises receiving, from the base station, a WT release request message,
  wherein the WT addition procedure comprises: receiving, from the base station, a WT addition request message including a security key updated by the base station, and
  wherein a radio resource control (RRC) message, including a value of a WT counter used in a derivation of the updated security key, is transmitted from the base station to the terminal for performing the WT addition procedure.

11. A base station for supporting LTE-WLAN aggregation (LWA), comprising:
   a transceiver; and
   a controller coupled with the transceiver and configured to control to:
      detect that a security key update triggering event for a WLAN termination (WT) occurs, the WT being connected with the base station and a terminal for the LWA;
      perform a WT modification procedure for updating the security key for the WT based on the detected security key update triggering event being associated with a first event; and
      perform a WT release procedure and a WT addition procedure for updating the security key for the WT based on the detected security key update triggering event being associated with a second event.

12. The base station of claim 11, wherein the controller is further configured to control to:
   identify the detected security key update triggering event as the first event based on re keying KeNB of the base station in an access stratum (AS) security content, and
   update the security key for the WT.

13. The base station of claim 12, wherein the controller is configured to control the transceiver to:
   transmit, to the WT, a WT modification request message including the updated security key; and
   transmit, to the terminal, a radio resource control (RRC) message including a value of a WT counter used in a derivation of the updated security key,
   wherein the updated security key is used by the terminal and the WT, based on a WLAN authentication being triggered.

14. The base station of claim 11, wherein the controller is further configured to control to:
   identify the detected security key update triggering event as the second event based on a mismatch in a packet data convergence protocol (PDCP) count when performing a counter check procedure; and
   update the security key for the WT.

15. The base station of claim 14, wherein the controller is configured to control the transceiver to:
   transmit, to the WT, a WT release request message;
   transmit, to the WT, a WT addition request message including the updated security key; and
   transmit, to the terminal, a radio resource control (RRC) message including a value of a WT counter used in a derivation of the updated security key.

16. A WLAN termination (WT) for supporting LTE-WLAN aggregation (LWA), comprising:
   a transceiver; and
   a controller coupled with the transceiver and configured to control to:
      perform a WT modification procedure for updating a security key for the WT based on a security key update triggering event associated with a first event being detected by a base station, and
      perform a WT release procedure and a WT addition procedure for updating the security key for the WT based on the security key update triggering event associated with a second event being detected by the base station,
   wherein the WT is connected to the base station and a terminal for the LWA, and
   wherein the security key for the WT is to be used between the terminal and the WT.

17. The WT of claim 16, wherein the first event is identified by the base station based on a re-keying of the base station in an access stratum (AS) security content.

18. The WT of claim 17, wherein the controller is configured to control the transceiver to receive, from the base station, a WT modification request message including a security key updated by the base station,
   wherein a radio resource control (RRC) message, including a value of a WT counter used in derivation of the updated security key, is transmitted from the base station to the terminal for performing the WT modification procedure, and
   wherein the updated security key is used by the terminal and the WT, based on a WLAN authentication being triggered.

19. The WT of claim 16, wherein the second event is identified by the base station based on a mismatch in a packet data convergence protocol (PDCP) count when performing a counter check procedure.

20. The WT of claim 19, wherein the controller is configured to control the transceiver to receive, from the base station, a WT release request message, and to receive, from the base station, a WT addition request message including a security key updated by the base station, and
   wherein a radio resource control (RRC) message, including a value of a WT counter used in a derivation of the updated security key, is transmitted from the base station to the terminal for performing the WT addition procedure.

21. A method for controlling a base station, the method comprising:
   detecting, for a wireless local area network (WLAN) termination (WT), a security key update triggering event, wherein the WT connects with the base station and a terminal;
   modifying a WT procedure for updating a security key for the WT, in response to detecting the security key update triggering event;
   updating the security key;
   transmitting, to the WT, a WT modification request message including the updated security key; and
   wherein the updated security key is used by the terminal and the WT, based on a WLAN authentication.

* * * * *